(12) United States Patent
Saleem

(10) Patent No.: US 12,099,036 B2
(45) Date of Patent: *Sep. 24, 2024

(54) TESTING METHOD FOR CONCRETE BEAM HAVING STEEL REINFORCEMENT

(71) Applicant: Imam Abdulrahman Bin Faisal University, Dammam (SA)

(72) Inventor: Muhammad Saleem, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/472,727

(22) Filed: Sep. 22, 2023

(65) Prior Publication Data

US 2024/0019403 A1 Jan. 18, 2024

Related U.S. Application Data

(63) Continuation of application No. 18/309,932, filed on May 1, 2023, now Pat. No. 11,796,512, which is a
(Continued)

(51) Int. Cl.
*G01N 29/07* (2006.01)
*G01N 29/04* (2006.01)
*G01N 29/44* (2006.01)

(52) U.S. Cl.
CPC ........... *G01N 29/07* (2013.01); *G01N 29/045* (2013.01); *G01N 29/4436* (2013.01);
(Continued)

(58) Field of Classification Search
CPC ............... G01N 29/07; G01N 29/4435; G01N 29/4481; G01N 2291/011;
(Continued)

(56) References Cited

U.S. PATENT DOCUMENTS 11,536,698 B2 12/2022 Saleem
11,686,708 B2 6/2023 Saleem
(Continued)

FOREIGN PATENT DOCUMENTS

DE 42 39 221 A1 5/1994
JP 3917359 82 5/2007
(Continued)

OTHER PUBLICATIONS

Kencanawati, et al; The study of ultrasonic pulse velocity on plain and reinforced damaged concrete ; MATEC Web of Conferences 195, 02026 (2018) ; 8 Pages.
(Continued)

*Primary Examiner* — John E Breene
*Assistant Examiner* — Rose M Miller
(74) *Attorney, Agent, or Firm* — Oblon, McClelland, Maier & Neustadt, L.L.P.

(57) ABSTRACT

A system for non-destructive testing of a bond condition of concrete beams reinforced by steel rods is described. The system includes a transducing transmitter, a transducing receiver, and an ultrasonic pulse generator configured to generate drive signals for the transducing transmitter and receive a plurality vibrational waves at the transducing receiver. The system further includes a computing device including a measurement circuit configured to record a transit time for each vibrational wave and divide a distance between the transducing transmitter and the transducing receiver by the transit time to determine a pulse velocity of each vibrational wave, a comparison circuit configured to identify a highest pulse velocity of the vibrational waves and compare each highest pulse velocity to a first reference pulse velocity, and a decision circuit including an artificial neural network configured to identify a compromised bond condition around a steel rod.

9 Claims, 31 Drawing Sheets

Related U.S. Application Data continuation of application No. 18/055,866, filed on Nov. 16, 2022, now Pat. No. 11,686,708, which is a continuation of application No. 17/235,463, filed on Apr. 20, 2021, now Pat. No. 11,536,698.

(52) U.S. Cl.
CPC ... *G01N 29/4481* (2013.01); *G01N 2291/011* (2013.01); *G01N 2291/0232* (2013.01); *G01N 2291/2626* (2013.01)

(58) Field of Classification Search
CPC ... G01N 2291/0232; G01N 2291/2626; G01N 29/045
USPC .......................................... 73/588, 597, 598
See application file for complete search history.

(56) References Cited

U.S. PATENT DOCUMENTS

| | | | |
|---|---|---|---|
| 2002/0184950 | A1 | 12/2002 | Kepler et al. |
| 2015/0309007 | A1 | 10/2015 | Bellotti |
| 2018/0059062 | A1 | 3/2018 | Saleem |
| 2020/0049687 | A1* | 2/2020 | Bellotti .................. G01N 29/07 |
| 2021/0096110 | A1* | 4/2021 | Iida ...................... G01M 5/0083 |
| 2022/0268737 | A1* | 8/2022 | Li ........................ G01N 29/348 |

FOREIGN PATENT DOCUMENTS

| | | |
|---|---|---|
| JP | 2015190839 A | 11/2015 |
| JP | 2018124254 A | 8/2018 |
| RU | 2 279 069 C1 | 6/2006 |
| RU | 2 707 984 C1 | 12/2019 |
| TW | 127 4871 B | 3/2007 |
| WO | 2020023967 A1 | 1/2020 |

OTHER PUBLICATIONS

Saleem, et al.; Development of non-destructive testing method to evaluate the bond quality of reinforced concrete beam; Structural Engineering and Mechanics, vol. 74, No. 3; pp. 313-323; Dec. 12, 2019; 11 Pages.

* cited by examiner

TESTING METHOD FOR CONCRETE BEAM HAVING STEEL REINFORCEMENT

CROSS-REFERENCE TO RELATED APPLICATIONS

The present application is a Continuation of U.S. application Ser. No. 18/309,932, now allowed, having a filing date of May 1, 2023 which is a Continuation of U.S. application Ser. No. 18,055,866, now U.S. Pat. No. 11,686, 708, having a filing date of Nov. 16, 2022, which is a Continuation of U.S. application Ser. No. 17/235,463, now U.S. Pat. No. 11,536,698, having a filing date of Apr. 20, 2021.

STATEMENT OF ACKNOWLEDGEMENT

The inventor(s) acknowledge the financial support provided by the Deanship of Scientific Research (DSR) at Imam Abdulrahman Bin Faisal University, IAU, Kingdom of Saudi Arabia for the financial support funded under project ID 2020-158-Eng.

TECHNICAL FIELD

The present disclosure is directed to a non-destructive testing method to evaluate a bond condition of reinforced concrete beam. In particular, the present disclosure relates to non-destructive ultrasonic pulse velocity testing method to evaluate a bond condition of reinforced concrete beam.

DESCRIPTION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Engineering design is challenge in which engineers use various type of materials is to achieve a desired structural performance. One of the fundamental components necessary to achieve the desired structural strength is the bond between steel and concrete in a reinforced concrete (RC) structure. Since concrete material has a high compressive strength, the bond strength in an RC structure is the ability of the steel reinforcement to resist slipping and support portions of the tensile load, thus allowing concrete material to carry the compressive force. Low bond strength leads to inadequate stress transfer resulting in tensile failure of the RC member. This type of failure is categorized as brittle or sudden failure (See: Qasrawi, H. Y. and Marie, I. A. (2013). "The use of USPV to anticipate failure in concrete under compression.", Cement Concrete Research, 33(12), 2017-2021; Saleem, M. (2017) "Study to detect bond degradation in reinforced concrete beams using ultrasonic pulse velocity test method.", Structural Engineering and Mechanics, An International Journal, 64(4), 427-436. DOI: hypertext transfer protocol ://doi.org/10.12989/sem.2017.64.4.427; Saleem, M., Blaisi N I. (2019) "Development, testing, and environmental impact assessment of glow-in-the-dark concrete.", Structural Concrete, Vol. 20, pp. 1792-1803, 2019. DOI: hypertext transfer protocol ://doi.org/10.1002/suco.201800221; Nolan C. and Andres, W. (2019). "Investigation of the effects of corrosion on bond strength of steel in concrete using neural network". The 2019 World Congress on Advances in Structural Engineering and Mechanics (ASEM19) Jeju Island, Korea, Sep. 17-21, 2019). The bond performance is responsible for the composite behavior and stress balance between steel and concrete. Research has been conducted to understand the bond behavior of steel reinforced concrete by experimentation, analytical and empirical modeling (See: Guillet, T. (2011) "Behavior of metal anchors under combined tension and shear cycling loads.", ACI Structural Journal, 108 (3), pp: 315-323; Desnerck, P, Lees, J. M., & Morley, C. T. (2015). "Bond behavior of reinforcing bars in cracked concrete". Construction and Building Materials, 94, 126-136; Tondolo, F. (2015). Bond behaviour with reinforcement corrosion. Construction and Building Materials, 93, 926-932). However, owing to the complexity of stresses at the interface of steel and concrete some assumptions were incorporated into the models in order to simplify the physical phenomenon. Hence, the true complex picture of the non-linear stress distribution has not been thoroughly investigated.

Testing of concrete beams is often .carried out to determine a suitability of a structure for its intended use. Non-destructive testing methods are commonly used to evaluate concrete properties by assessing the strength, quality, and other properties such as permeability, cracking, and void structure. The test results of the non-destructive testing methods can be used to determine whether repairs should be made to a structure or if the integrity of the structure is sufficient as is.

An ultrasonic pulse velocity tester is described in U.S. Patent Application Publication No. US 2018/0059062 A1. "Ultrasonic pulse velocity tester", incorporated herein by reference in its entirety. The ultrasonic pulse velocity tester includes circuitry configured to process ultrasonic measurement signals. Further, the ultrasonic pulse velocity tester includes a first probe and a second probe connected to the circuitry. An ultrasonic signal is transmitted by the circuitry through the first probe and rebounded by the second probe. The circuitry detects a time duration to receive the rebounded signal and compares the time duration to a reference measurement data.

Ultrasonic testing of the fire resistance of construction materials is described in Russian Patent Application No. RU 2707984 C1, "Method of determining fire resistance of construction materials and structural elements". This patent application describes that When an ultrasonic wave amplitude is reduced in a material, crack formation is identified. The material is subjected to heating and an ultrasonic pulse velocity test was conducted under different heating levels, until the material cracked. Further, crack detection in reinforced concrete beams carried out at negative temperatures is described in Russian Patent Application No. RU2279069 C1, "Mode of ultrasound control in the process of exploitation of concrete and reinforced concrete constructions of erections for availability of deep cracks". Also, a non-contact inspection system is described in U.S. Patent Application Publication No. 200.2/0184950 A1, "Non-contact inspection system for large concrete structures", incorporated herein by reference in its entire This patent application described testing of large concrete structures such as dams, in which a laser transmitter-receiver is modulated by the acoustic wave.

In addition to the above research, a study of ultrasonic pulse velocity on plain and reinforced damaged concrete is described. (See: "The study of ultrasonic pulse velocity on plain and reinforced damaged concrete", Mataram University Kumamoto University).

Artificial neural networks (ANN) are based on the concept of human brain neural network, since human brain is a highly complex, non-linear parallel computer consisting of neurons responsible for undertaking simultaneous multiple tasks. ANNs are also composed of similar structures with several neurons that are excellent for pattern recognition, prediction, classification, categorization. The fundamental benefit of using ANN over traditional analytical modeling is the lack of need to make simplification assumptions. By adopting ANN, researchers have been able recognize patterns in complex non-linear problems. However, the fundamental drawback of using ANNs is the need of large amounts of training data necessary to avoid overfitting and underfitting.

None of the systems and methods described above have the capability to investigate bond condition along lengths of embedded steel rods in reinforced concrete beams under different mechanical stress loads.

Accordingly, it is one object of the present disclosure to provide systems and methods for investigation of bond condition along lengths of embedded steel rods in reinforced concrete beams under different mechanical stress loads and to identify the width of cracks formed around the bonds.

SUMMARY

In an exemplary embodiment, a method for non-destructive testing of a bond condition of concrete beams reinforced by steel rods is described, including applying, by a transmitting transducer of an ultrasonic tester, ultrasonic pulses to a concrete beam; receiving, by an ultrasonic receiver, vibrational waves reflected from the steel rods at a plurality of reading locations along the concrete beam; measuring a transit time of the vibrational waves received at each reading location; determining a pulse velocity of each vibrational wave received at each reading location; determining a highest pulse velocity of the vibrational waves at each reading location; comparing the highest pulse velocity of the vibrational waves received at a reading location to a first reference pulse velocity; and identifying a bond condition of cracking around a steel rod at a testing location when the highest pulse velocity at the testing, location is less than the first reference pulse velocity.

In another exemplary embodiment, a non-destructive ultrasonic testing method of the bond condition of a concrete beam reinforced by steel rods is described, including applying, by a transmitting transducer of an ultrasonic tester, ultrasonic pulses to a concrete beam; receiving, by an ultrasonic receiver, vibrational waves reflected from the steel rods at a plurality of reading locations along the concrete beam; measuring a transit time of the vibrational waves received at each reading location; determining a pulse velocity of each vibrational wave received at each reading location; determining a highest pulse velocity of the vibrational waves at each reading location, the highest pulse velocity at each reading location defining a first reference pulse velocity at the reading location; determining a peak load carrying capacity ($P_{peak}$) of the concrete beam by applying a force perpendicular to a center of a length of the concrete beam; applying a second set of ultrasonic pulses to the concrete beam; measuring a highest pulse velocity at each reading location received from the second set of ultrasonic pulses; increasing a magnitude of the force by increments; measuring a highest pulse velocity at each reading location for each incremental increase in the magnitude of the force; determining the $P_{peak}$ of the concrete beam when the highest pulse velocity at one of the reading locations is less than a second reference pulse velocity, where the second reference pulse velocity is less than the first reference pulse velocity.

In yet another exemplary embodiment, a system for non-destructive testing of the bond condition of concrete beams reinforced by steel rods is described, including a transducing transmitter; a transducing receiver; an ultrasonic pulse generator configured to generate drive signals for the transducing transmitter and receive a plurality vibrational waves at the transducing receiver; a computing device including a measurement circuit configured to record a transit time for each vibrational wave and divide a distance between the transducing transmitter and the transducing receiver by the transit time to determine a pulse velocity of each vibrational wave; a comparison circuit configured to identify a highest pulse velocity of the vibrational waves and compare each highest pulse velocity to a first reference pulse velocity; and a decision circuit configured to identify a compromised bond condition around a steel rod when the highest pulse velocity is less than the first reference pulse velocity.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
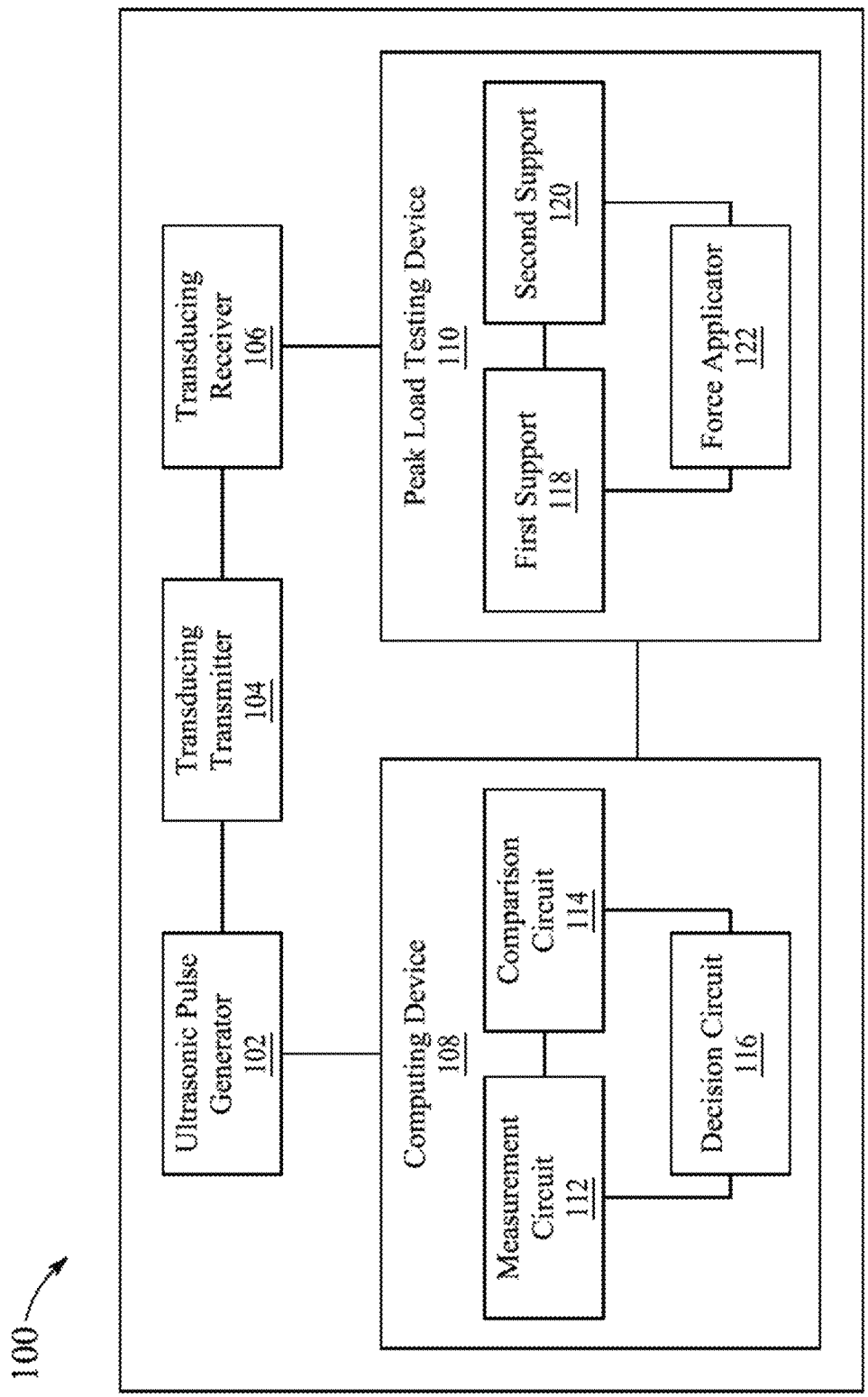
FIG. 1 is a schematic diagram of a system for non-destructive testing of bond condition of concrete beams reinforced by steel rods, according to exemplary aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to systems and methods for non-destructive ultrasonic testing of the bond condition of concrete beams reinforced by steel rods.

FIG. 1 is a schematic diagram of a system 100 for non-destructive testing of bond condition of concrete beams reinforced by steel rods, according to exemplary aspects of the present disclosure.

According to an aspect of the present disclosure, the system 100 may be configured to perform an ultrasonic pulse velocity (UPV) test to evaluate the quality and strength of reinforced concrete beams.

Referring to FIG. 1, the system 100 (also referred to as ultrasonic tester 100) may include an ultrasonic pulse generator 102, a transducing transmitter 104 (also referred to as a transmitting transducer 104), a transducing receiver 106 (also referred to as a receiving transducer 106), a computing device 108, and a peak load testing device 110. The computing device 108 may further include a measurement circuit 112, a comparison circuit 114, and a decision circuit 116. The peak load testing device 110 may further include a first support 118, a second support 120, and a force applicator 122.

In an aspect of the present disclosure, the ultrasonic pulse generator 102 may be any device that may be configured to generate a plurality of drive signals (or electrical signals) to excite the transducing transmitter 104. In an example, the plurality of drive signals may be high voltage signals. According to an aspect, the transducing transmitter 104 may be configured to. convert the plurality of drive signals into a plurality of ultrasonic pulses. When the plurality of ultrasonic pulses is applied to concrete beams by the transducing transmitter 104, the plurality of ultrasonic pulses may undergo multiple reflections at the surfaces of the concrete beams, and may reflect back to the transducing receiver 106. In an example, the transducing transmitter 104 and the transducing receiver 106 may be configured to operate at a frequency range of about 20 kHz to about 150 kHz. Also, in an example, the transducing transmitter 104 and the transducing receiver 106 may be piezoelectric transducers, capacitive transducers, magnetostrictive transducers, or any other suitable type of transducers.

Referring back to FIG. 1, the computing system 108 may be a desktop computer, a laptop, a tablet computer, a mobile device, a Personal Digital Assistant (PDA) or any other computing device. The computing system 108 may be communicatively coupled to the ultrasonic pulse generator 102, the transducing transmitter 104, the transducing receiver 106, and the peak load testing, device 110. In an example, the computing, system 108 may control and monitor the functioning of the ultrasonic pulse generator 102, the transducing transmitter 104, the transducing receiver 106, and the peak load testing device 110.

According to an aspect of the present disclosure, to perform a UPV test on a concrete beam, the transducing transmitter 104 and the transducing receiver 106 may be attached to the concrete beam. In an example, the transducing transmitter 104 and the transducing receiver 106 may be placed on either side of the concrete beam. For example, the transducing transmitter 104 and the transducing receiver 106 may be attached on opposite sides of the concrete beam.

The concrete beam may be reinforced by a plurality of steel rods. Although the disclosed system 100 is applicable to the concrete beams having more than two rods, the description hereinafter is explained with respect to two steel rods, namely a first steel rod and a second steel rod. According to an aspect of the present disclosure, the first steel rod may be placed at a top of the concrete beam, and the second steel rod may be placed at a bottom of the concrete beam. The first steel rod and the second steel rod may collectively be referred to as steel rods.

In an aspect of the present disclosure, the concrete beam may be marked with a grid having a plurality of rows and a plurality of columns. In an example, the concrete beam may be marked with the grid using guide wires. The concrete beam may be marked with a grid having two rows, namely a first row and a second row, and nine columns. The first row may be parallel to and separated from the second row by a distance in a range of about 140 mm to about 160 mm. Further, each column may be parallel to an adjacent column and separated from the adjacent column by a distance in a range of about 90 mm to about 110 mm. Further, a plurality of reading locations may be marked on the first row parallel to a length of the first steel rod within the concrete beam, and a plurality of reading locations may be masked on the second row parallel to a length of the second steel rod within the concrete beam. In an example, an intersection of a row with a column may define a reading location.

According to an aspect of the present disclosure, the transducing transmitter 104 may contact the concrete beam at each of the plurality of reading locations and the transducing receiver 106 may be attached to the concrete beam at a location perpendicular to a length of the steel rods. To ensure that the plurality of ultrasonic pulses generated at the transducing transmitter 104 passes into the concrete beam and gets detected by the transducing receiver 106, adequate coupling between the concrete beam, the transducing transmitter 104, and the transducing receiver 106 may be required. In an example, the transducing transmitter 104 and the transducing receiver 106 may be attached to the concrete beam using petroleum gel or any other suitable coupling means.

In an aspect of the present disclosure, to initiate the UPV test on the concrete beam, the ultrasonic pulse generator 102 may be configured to generate the plurality of drive: signals for the transducing transmitter 104. The transducing transmitter 104 may be configured to convert the plurality of drive signals into the plurality of ultrasonic pulses. Further, the transducing receiver 104 may be configured to apply a first set of ultrasonic pulses to the concrete beam. When the first set of ultrasonic pulses are applied to the concrete beam, a plurality of vibrational waves may be reflected from the steel rods at the plurality of reading locations along the concrete beam. In an aspect, the transducing receiver 106 may be configured to receive the plurality of vibrational waves reflected from the steel rods at the plurality of reading locations along the concrete beam. The plurality of vibrational waves may be referred to as vibrational waves hereinafter.

The measurement circuit 112 may be configured to record or measure a transit time (denoted by T) of each vibrational wave received at each reading location. Further, the measurement circuit 112 may be configured to determine a pulse velocity (denoted by V) of each vibrational wave received at each reading location. In an example, a pulse velocity of a vibrational wave may be determined based on a path length of the vibration wave. In an aspect, the measurement circuit 112 may be configured to determine a pulse velocity of a vibrational wave at a reading location by dividing a distance between the transducing, receiver 106 from the reading location by the transit time of the vibrational wave received at the reading location.

The comparison circuit 114 may be configured to identify or determine a highest pulse velocity of the vibrational waves at each reading location. Further, the comparison circuit 114 may be configured to compare each highest pulse velocity to a first reference pulse velocity. In an aspect of the present disclosure, the first reference pulse velocity may be predefined. In an example, a value of the first reference pulse velocity may be about 6500 m/s.

According to an aspect of the present disclosure, the decision circuit 116 may identify a compromised bond condition of cracking around the steel rods at a testing location when the highest pulse velocity is less than the first reference pulse velocity. In an example, the testing location may refer to one of the plurality of reading locations. When the highest pulse velocity is more than the first reference pulse velocity, this may be indicative of an acceptable bond condition and quality.

In an aspect of the present disclosure, the first support 118 may be configured to support a first bottom end of the concrete beam, and the second support 120 may be configured to support a second bottom end of the concrete beam. The force applicator 122 may be configured to provide a variable force to a top centre of the concrete beam. In an example, the force applicator 122 is a device for applying a controlled force at a point of contact (for example, the top centre) on the concrete beam.

The measurement circuit 112 may be configured to record measurements of pulse velocities at the plurality of reading locations for each change in the variable force. Also, the measurement circuit 112 may be configured to determine a second reference pulse velocity at each reading location by measuring the highest pulse velocity when the force applied to the concrete beam is 75% of a peak load carrying capacity ($P_{peak}$) of the concrete beam. According to an aspect of the present disclosure, the measurement circuit 112 may determine the $P_{peak}$ of the concrete beam by applying, a force perpendicular to a centre of a length of the concrete beam. In an aspect, the comparison circuit 114 may be configured to determine the first reference pulse velocity at each reading location by measuring the highest pulse velocity when the force applied to the concrete beam is zero.

In an aspect of the present disclosure, the transducing transmitter 104 may be configured to apply a second set of ultrasonic pulses to the concrete beam. Further, the comparison circuit 114 may be configured to determine a highest pulse velocity at each reading location received from the second set of ultrasonic pulses. The force applicator 122 may further be configured to increase a magnitude of the force by increments and measure the highest pulse velocity at each reading location for each incremental increase in the magnitude of the force. In an example, the force applicator 122 may be configured to increase the magnitude of the force in equal increments of 10 percent.

According to an aspect, the measurement circuit 112 may determine the $P_{peak}$ of the concrete beam when the highest pulse velocity at one of the reading locations is less than the second reference pulse velocity. In an example, the second reference pulse velocity may be less than the first reference pulse velocity. In an example, a value of the second reference pulse velocity may be about 5000 m/s.

Further, the comparison circuit 114 may be configured to compare the highest pulse velocity of the vibrational waves received at each reading location to the second reference pulse velocity. In an aspect, the decision circuit 116 may identify an amplitude of the variable force at which the highest pulse velocity is less than the second reference pulse velocity. In an example, the second reference pulse velocity may indicate a bond condition of cracking of the concrete beam around the steel rods. The decision circuit 116 may identify the bond condition of cracking around the steel rods at the testing location when the highest pulse velocity at the testing location is less than the second reference pulse velocity. When the highest pulse velocity is more than the second reference pulse velocity, this may be indicative of an acceptable bond condition and quality.

Figure 2:
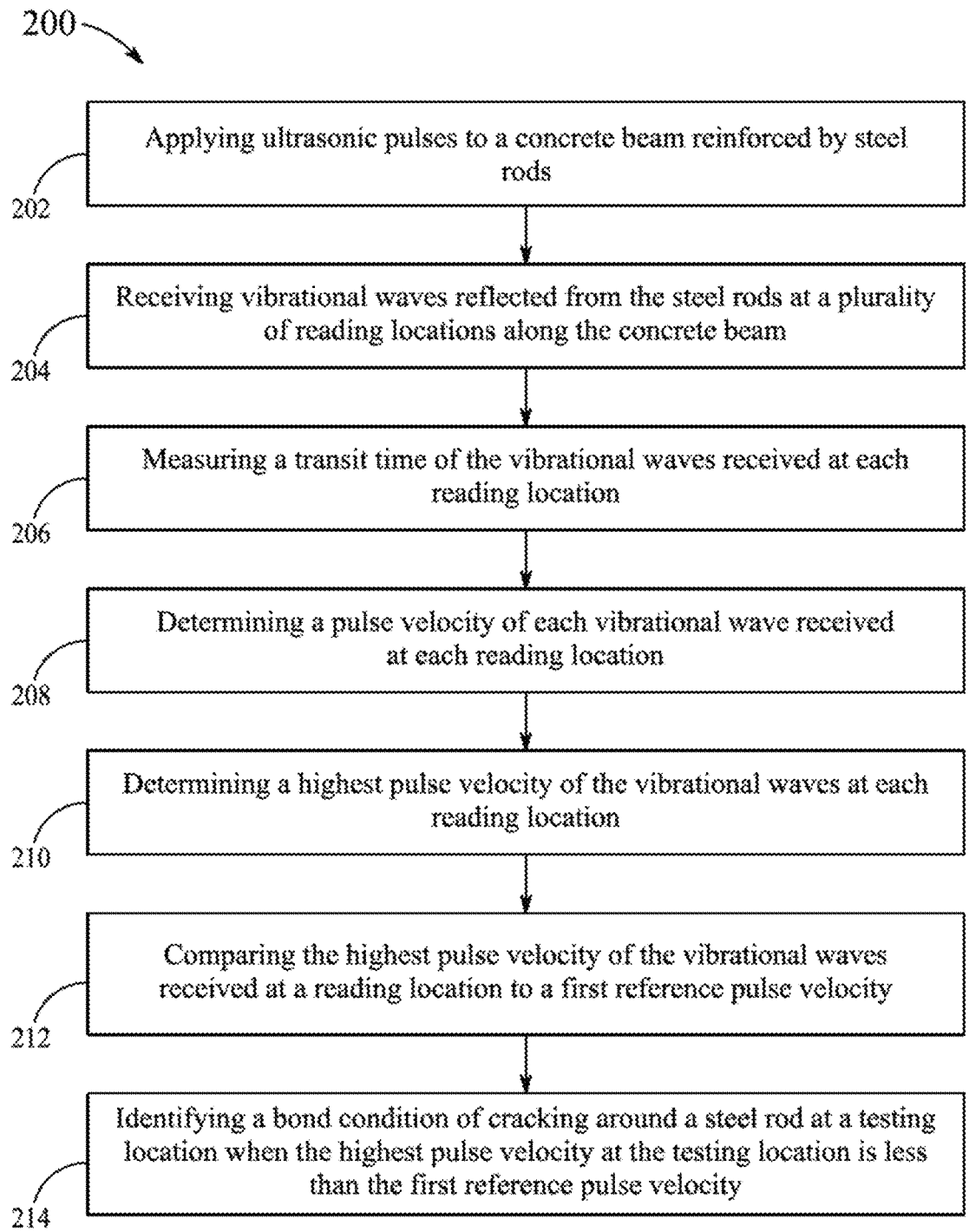
FIG. 2 illustrates a method of identifying a bond condition of a concrete beam based on a first reference pulse velocity, according to exemplary aspects of the present disclosure.

FIG. 2 illustrates a method 200 of identifying a bond condition of a concrete beam based on a first reference pulse velocity, according to exemplary aspects of the present disclosure.

At step 202, the method 200 includes applying ultrasonic pulses to a concrete beam reinforced by steel rods. According to aspects of the present disclosure, the transmitting transducer 104 may be configured to apply ultrasonic pulses to the concrete beam.

At step 204, the method 200 includes receiving vibrational waves reflected from the steel rods at a plurality of reading locations along the concrete beam. In an example, when the ultrasonic pulses are applied to the concrete beam, the vibrational waves may be reflected from the steel rods at the plurality of reading locations along the concrete beam. According to aspects of the present disclosure, the receiving. transducer 106 may be configured to receive the vibrational waves reflected from the steel rods at the plurality of reading locations along the concrete beam.

At step 206, the method 200 includes measuring a transit time of the vibrational waves received at each reading location. In an aspect of the present disclosure, the measurement circuit 112 may be configured to measure the transit time of each vibrational wave received at each reading location.

At step 208, the method 200 includes determining a pulse velocity of each vibrational wave received at each reading, location. According to aspects of the present disclosure, the measurement circuit 112 may be configured to determine the pulse velocity of each vibrational wave received at each reading location. In an aspect, the measurement circuit 112 may be configured to determine a pulse velocity of a vibrational wave at a reading location by dividing a distance between the receiving transducer 106 from the reading location by the transit time of the vibrational wave received at the reading location.

At step 210, the method 200 includes determining a highest pulse velocity of the vibrational waves at each reading location. According to an aspect of the present disclosure, the comparison circuit 114 may be configured to determine the highest pulse velocity of the vibrational waves at each reading location.

At step 212, the method 200 includes comparing the highest pulse velocity of the vibrational waves received at a reading location to a first reference pulse velocity. According to aspects of the present disclosure, the comparison circuit 114 may be configured to compare each highest pulse velocity to a first reference pulse velocity. In an example, a value of the first reference pulse velocity may be about 6500 m/s.

At step 214, the method 200 includes identifying a bond condition of cracking around a steel rod at a testing location when the highest pulse velocity at the testing location is less than the first reference pulse velocity. In an example, the testing location may refer to one of the plurality of reading locations. According to an aspect of the present disclosure, the decision circuit 116 may identify a compromised bond condition of cracking around the steel rods at the testing location when the highest pulse velocity is less than the first reference pulse velocity.

Figure 3A:
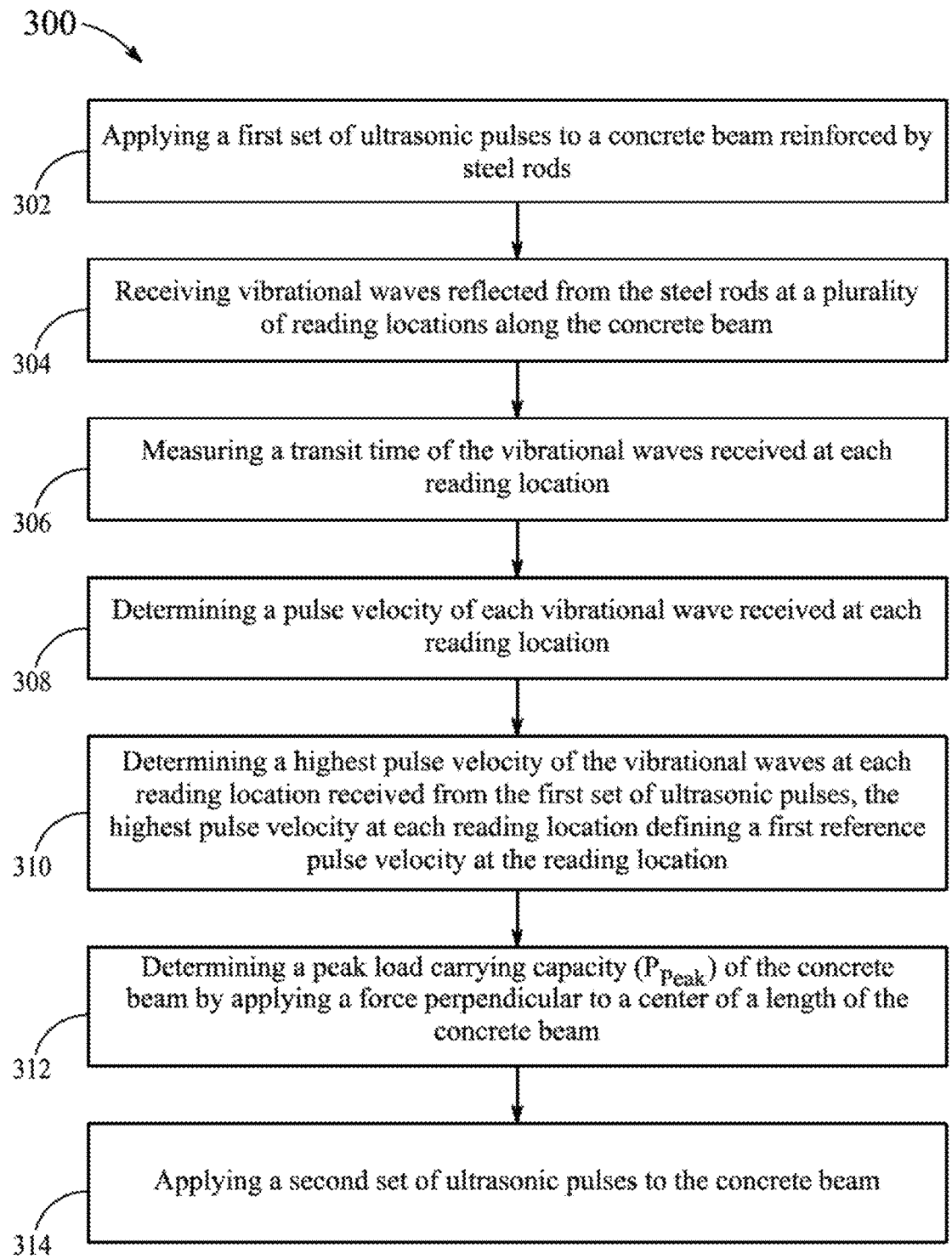
FIGS. 3A and 3B illustrate a method of identifying a bond condition of a concrete beam based on a second reference pulse velocity, according to exemplary aspects of the present disclosure.
Figure 3B:
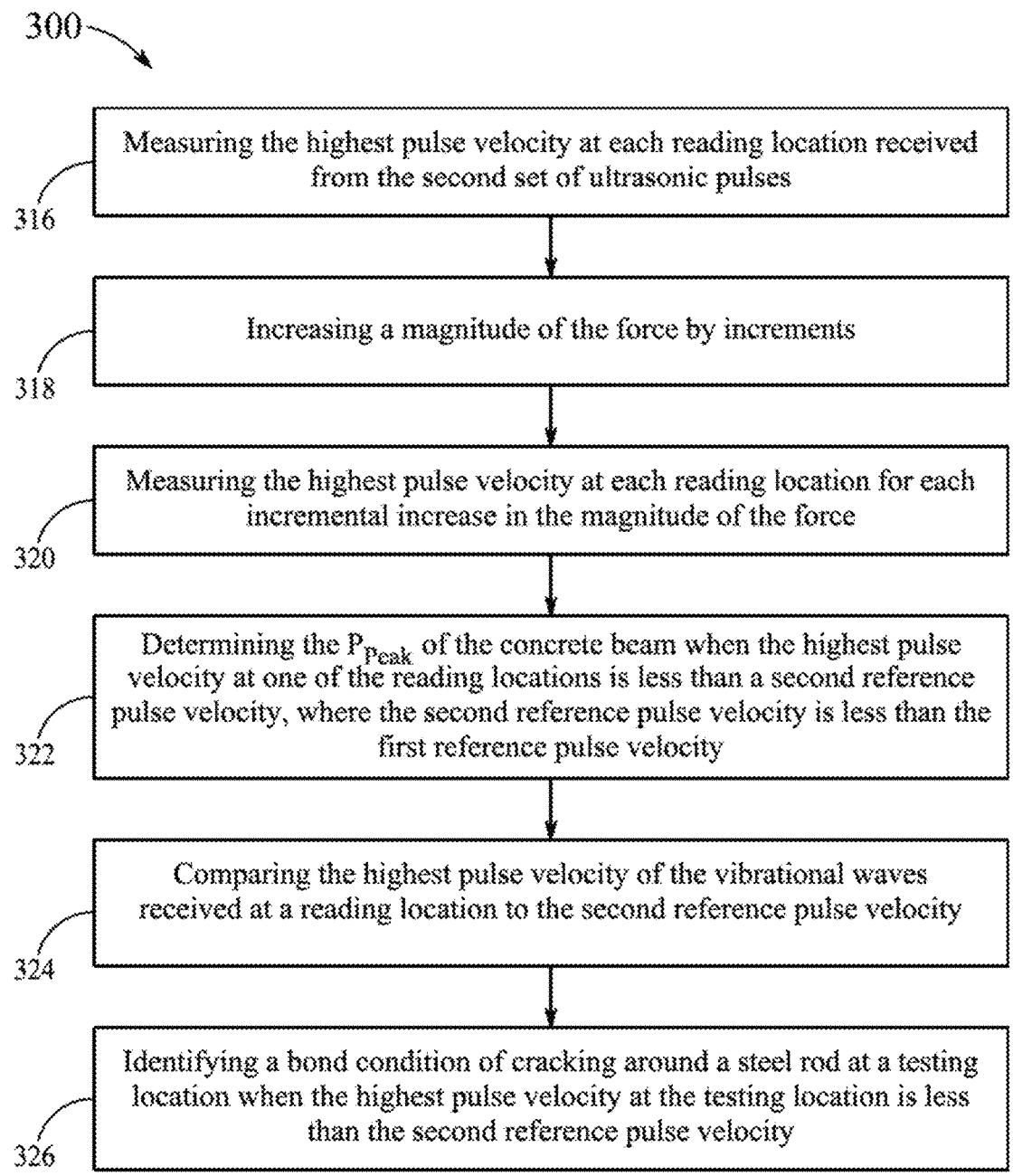

FIGS. 3A and 3B illustrate a method 300 of identifying a bond condition of a concrete beam based on a second reference pulse velocity, according to exemplary aspects of the present disclosure.

At step 302, the method 300 includes applying a first set of ultrasonic pulses to a concrete beam. According to aspects of the present disclosure, the transmitting transducer 104 may be configured to apply the first set of ultrasonic pulses to the concrete beam.

At step 304, the method 300 includes receiving vibrational waves reflected from the steel rods at a plurality of reading locations along the concrete beam. According to aspects of the present disclosure, the receiving transducer 106 may be configured to receive the vibrational waves reflected from the steel rods at the plurality of reading locations along the concrete beam.

At step 306, the method 300 includes measuring a transit time of the vibrational waves received at each reading location. In an aspect of the present disclosure, the measurement circuit 112 may be configured to measure the transit time of each vibrational wave received at each reading location.

At step 308, the method 300 includes determining a pulse velocity of each vibrational wave received at each reading location. According to aspects of the present disclosure, the measurement circuit 112 may be configured to determine the pulse velocity of each vibrational wave received at each reading location. In an aspect, the measurement circuit 112 may be configured to determine a pulse velocity of a vibrational wave at a reading location by dividing a distance between the receiving transducer 106 from the reading location by the transit time of the vibrational wave received at the reading location.

At step 310, the method 300 includes determining a highest pulse velocity of the vibrational waves at each reading location. In an example, the highest pulse velocity at each reading location defines a first reference pulse velocity at the reading location. In an example, a value of the first reference pulse velocity may be about 6500 m/s. According to an aspect of the present disclosure, the comparison circuit 114 may be configured to determine the highest pulse velocity of the vibrational waves at each reading location.

At step 312, the method 300 includes determining a peak load carrying capacity ($P_{peak}$) of the concrete beam by applying a force perpendicular to a center of a length of the concrete beam. According to aspects of the present disclosure, the force applicator 122 may be configured to apply the force perpendicular to the center of the length of the concrete beam to determine the $P_{peak}$ of the concrete beam.

At step 314, the method 300 includes applying a second set of ultrasonic pulses to the concrete beam. According to aspects of the present disclosure, the transmitting transducer 104 may be configured to apply the second set of ultrasonic pulses to the concrete beam.

At step 316, the method 300 includes measuring the highest pulse velocity at each reading location received from the second set of ultrasonic pulses. According to aspects of the present disclosure, the comparison circuit 114 may be configured to determine the highest pulse velocity at each reading location received from the second set of ultrasonic pulses.

At step 318, the method 300 includes increasing a magnitude of the force by increments. In an example, the magnitude of the force may be increased in equal increments of 10 percent. According to an aspect of the present disclosure, the force applicator 122 may be configured to increase the magnitude of the force by increments.

At step 320, the method 300 includes measuring the highest pulse velocity at each reading location for each incremental increase in the magnitude of the force, in aspect of the present disclosure, the comparison circuit 114 may be configured to measure the highest pulse velocity at each reading location for each incremental increase in the magnitude of the force.

At step 322, the method 300 includes determining the $P_{peak}$ of the concrete beam when the highest pulse velocity at one of the reading locations is less than a second reference pulse velocity. In an example, the second reference pulse velocity is less than the first reference pulse velocity. In an example, a value of the second reference pulse velocity may be about 5000 m/s. According to an aspect, the measurement circuit 112 may determine the $P_{peak}$ of the concrete beam when the highest pulse velocity at one of the reading locations is less than the second reference pulse velocity.

At step 324, the method 300 includes comparing the highest pulse velocity of the vibrational waves received at a reading location to the second reference pulse velocity. In an aspect, the comparison circuit 114 may be configured to compare the highest pulse velocity of the vibrational waves received at each reading location to the second reference pulse velocity.

At step 326, the method 300 includes identifying a bond condition of cracking around a steel rod at a testing location when the highest pulse velocity of the vibrational waves at the testing location is less than the second reference pulse velocity. In an aspect, the decision circuit 116 may identify the bond condition of cracking around the steel rods at the testing location when the highest pulse velocity at the testing location is less than the second reference pulse velocity. When the highest pulse velocity is more than the second reference pulse velocity, this may be indicative of an acceptable bond condition and quality.

Examples and Experiments

The following examples are provided to illustrate further and to facilitate the understanding of the present disclosure.

Experimental Data and Analysis

A detailed experimental research was conducted by testing four identical concrete beam samples using an UPV testing method. An objective of the experiment was to use the UPV testing method to investigate a bond condition along the length of steel reinforcements embedded in the concrete beam samples. A delay in ultrasonic wave transit time for the fixed path length was considered to identify the onset of internal cracking in the concrete beam samples. Further, the objective of the experiment was to identify delay in ultrasonic wave propagation with initiation and development of internal cracks in the concrete beam samples.

Figure 4:
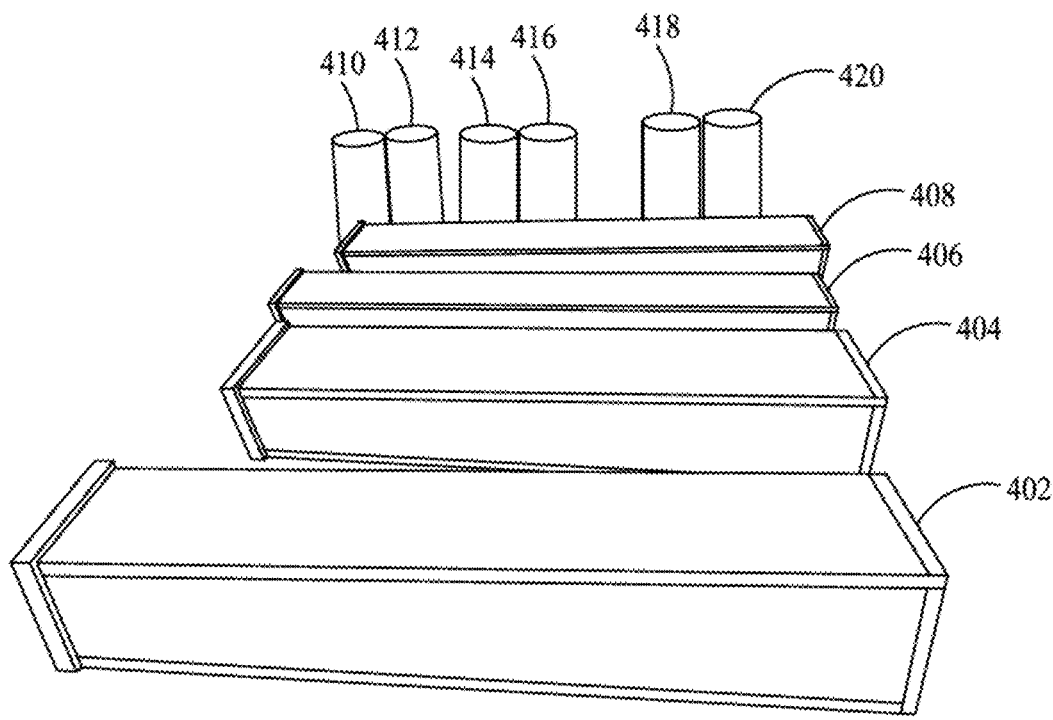
FIG. 4 shows concrete beam samples and concrete cylinder specimens evaluated using an ultrasonic pulse velocity (UPV) testing method, according to exemplary aspects of the present disclosure.

The four identical concrete beam samples of size 150×150×1000 mm were cast using Type 1 Ordinary Portland Cement (OPC). The concrete beam samples were cast along with six concrete cylinder specimens of 100 mm diameter and 200 mm height for testing the comprehensive strength of the concrete beam samples. The OPC is a basic ingredient of concrete, mortar, stucco, and non-specialty grout. The air content of the mortar amounted to 6.1% by volume and initial and final setting time was recorded using a Vicat apparatus as 160 and 240 mins, respectively. The specific gravity of OPC was 3.1. Fine aggregate was substituted using desert sand which consisted of water absorption of 0.83% and specific gravity of 2.57, while limestone was used as coarse aggregate with maximum diameter of 18 mm following the gradation curve as specified under ASTM C33. Bulk specific gravity and water absorption of limestone coarse aggregate was of 2.37 and 1.95%, respectively. A water-to-cement ratio of the concrete was set at 0.38 with a fine to coarse aggregate ratio as 0.59 by mass. A slump reading of concrete was recorded as 100 mm and polycarboxylate ether was used as superplasticizer by 0.7% weight of cement. The four concrete beam samples and the concrete cylinder specimens that were evaluated using the UPV testing method are shown in FIG. 4. The four concrete beam samples include a first concrete beam 402, a second concrete beam 404, a third concrete beam 406, and a fourth concrete beam 408. Further, the six cylinder specimens include a first cylinder specimen 410, a second cylinder specimen 412, a third cylinder specimen 414, a fourth cylinder specimen 416 a fifth cylinder specimen 418, and a sixth cylinder specimen 420.

Figure 5:
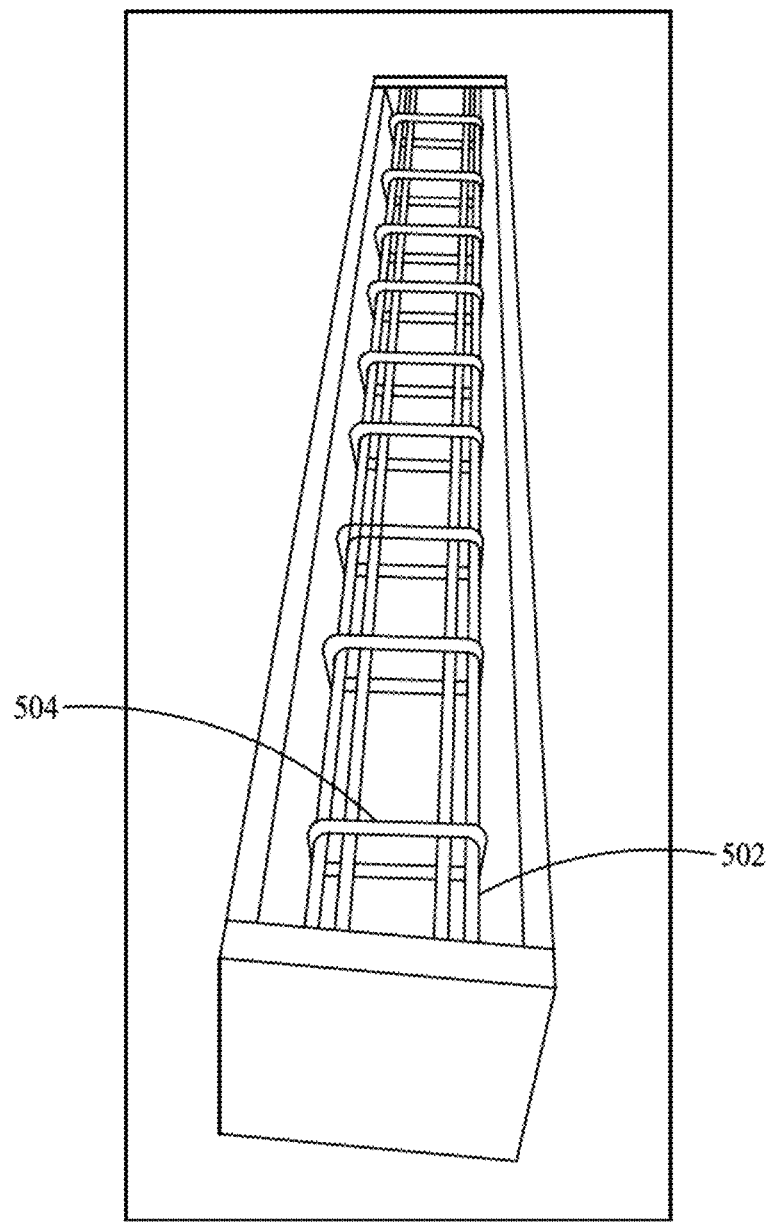
FIG. 5 shows steel reinforcements and shear reinforcements of a concrete beam sample, according to exemplary aspects of the present disclosure.

Further, steel reinforcements including two steel rods of 10 mm diameter and two steel rods of 15 mm diameter were used as compression and tension reinforcements, respectively. Also, shear stirrup reinforcement of 10 mm diameter with center-to-center spacing of 80 mm were used to arrest shear cracks from the ultrasonic wave propagation. The concrete beam samples were designed to fail in flexure to allow for vertical cracks to develop greater than shear cracks. The flexure failure assists in identifying delay in ultrasonic wave propagation with the initiation and development of internal cracks in the concrete beam samples. The steel reinforcements (i.e., the tension and compression reinforcements) and shear reinforcements used in a concrete beam sample are shown in FIG. 5. As can be seen in FIG. 5, the concrete beam sample includes steel reinforcements 502 and shear reinforcements 504.

Each concrete beam sample was divided into two zones, namely a top zone and a bottom zone based on the variation in steel reinforcement diameter. The bottom zone included two 15 mm diameter steel reinforcement and 10 min diameter shear stirrup reinforcement. The top zone included two 10 mm diameter steel reinforcement along with 10 mm diameter shear stirrup reinforcement. The concrete beam samples were divided into the top and bottom zones to conduct the UPV testing method for the two types of steel reinforcements. Further, the objective of using steel reinforcements of two different diameter was to judge the variation in ultrasonic wave propagation velocity for the fixed path length.

Figure 6:
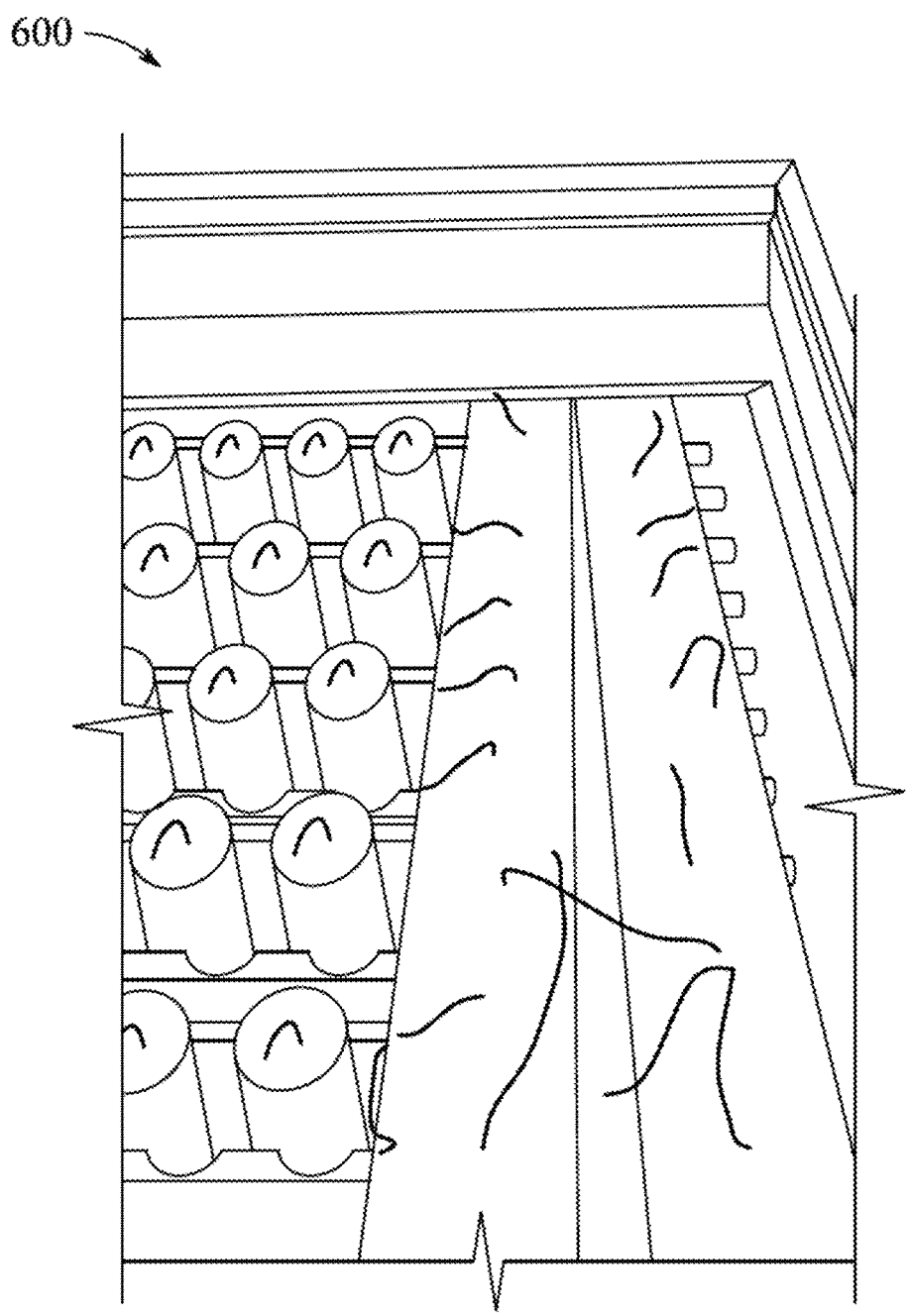
FIG. 6 shows curing of the concrete beam samples, according to exemplary aspects of the present disclosure.

After the concrete beam samples were cast, the concrete beam samples were cured in a water tank for 28 days and then placed outside the water tank with wet jute bags covered with a plastic sheet in a temperature-controlled laboratory at 25° C.±3° C. During the experimental research, standard practice for casting and curing of concrete beam samples as specified by American Society Of Testing And Material (ASTM) C192 technical specifications was adhered in order to achieve consistency and assure quality of the concrete beam samples. Further, the cylinder specimens were tested as per ASTM C39 technical specifications to ensure quality and uniformity of test protocol. The cylinder specimens were tested by applying uniform axial loading on top till the concrete beam samples reached failure. The average compressive strength was recorded as 30.95 MPa with a coefficient of variation of 1.6% which is within the acceptable limit of 3.2%. FIG. 6 shows curing 600 of the concrete beam samples.

Figure 7:
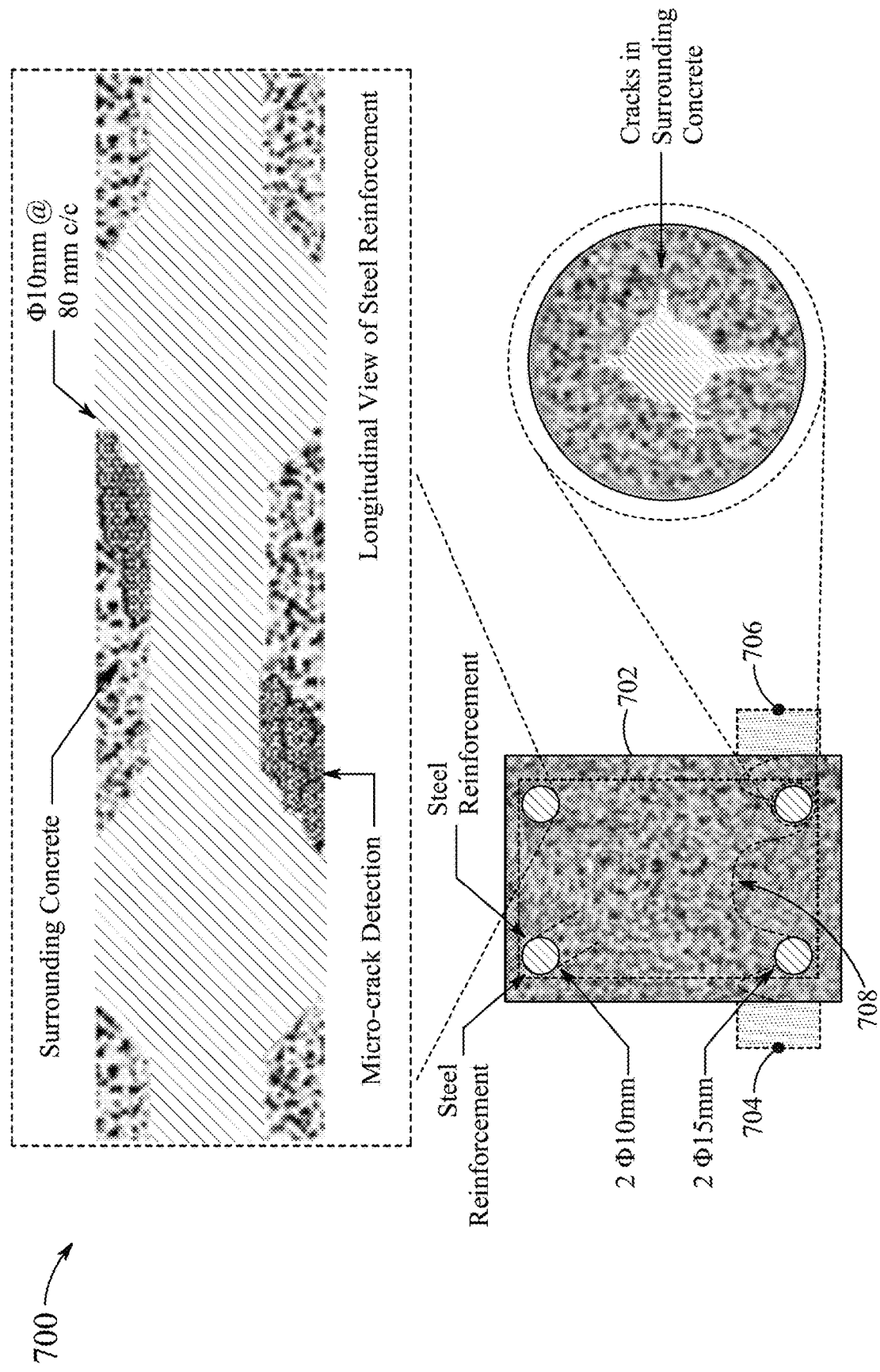
FIG. 7 depicts a conceptual diagram of a concrete beam sample evaluated using the UPV testing method, according to exemplary aspects of the present disclosure.

In the present disclosure, the cylinder specimens closely represent the real-world beam member. An artificial neural network (ANN) takes into consideration the mechanical and material parameters of the test specimen for predicting the crack width and performing sensitivity analysis of various parameters that affect the bond performance. FIG. 7 depicts the conceptual schematic diagram of the experiment. It can be visualized that for perfect uncracked bond condition the ultra-sonic pulse passes through the RC beam element width. As the loading is increased, the beam undergoes micro-cracking at the steel-concrete interface. This leads to delay in the ultra-sonic pulse to travel the fixed path length. This phenomenon identifies the location of cracked concrete along the length of steel reinforcement. The RC beam element has been divided into two zones, a top zone consisting of two 14 mm steel reinforcements and bottom zone consisting, of three 16 mm Φ steel reinforcements and a shear stirrup reinforcement consisting of 10 mm Φ bars with center to center spacing of 100 mm was used. The crack width was also measured during the experimentation. An artificial feed-forward perceptron neural network was developed to predict the crack width and good agreement was found between the experimental and predicted values using ANN. Past research in this area was focused on using UPV test to predict concrete strength, however, the present disclosure is focused on using UPV test to allow field engineers to identify areas of poor bond along the length of steel reinforcement embedded in RC members. This technique can be adopted for continued monitoring of structures and for establishing a benchmark for new structures. Field engineers using, this technique can quickly isolate areas for repairs in case of damage owing to natural or man-made causes, thereby reducing time, cost and effort needed for maintenance of infrastructure utilities.

As shown in FIG. 7, the transducing transmitter 704 and the transducing receiver 706 were attached to the concrete beam sample 702 on either side of the concrete beam sample 702. The concrete beam sample 702 was tested by applying gradually increasing loading in constant intervals. Further, the ultrasonic wave readings were recorded at each stage of loading. Through the delay in an ultrasonic wave 708 to travel the same path length, the initiation and development of internal cracking was ascertained.

The bond condition of steel reinforcement embedded in the concrete beam sample 702 was evaluated by relating the pulse velocity of the ultrasonic wave 708 to the presence of a crack (for example, a micro-crack) in the vicinity of steel reinforcement. It was identified that there was delay in time for the Ultrasonic wave 708 to travel the fixed path length caused by initiation, development, and propagation of internal cracks. The delay in ultrasonic wave 708 to travel the fixed path length before and after the application of external loading was attributed to the presence of cracks in the concrete beam sample. Direct and semi-direct method of investigation were used in the UPV testing method and areas of bond degradation owing to crack initiation, development, and propagation were identified. This led to the assessment of bond condition along the length of steel reinforcement.

Figure 8:
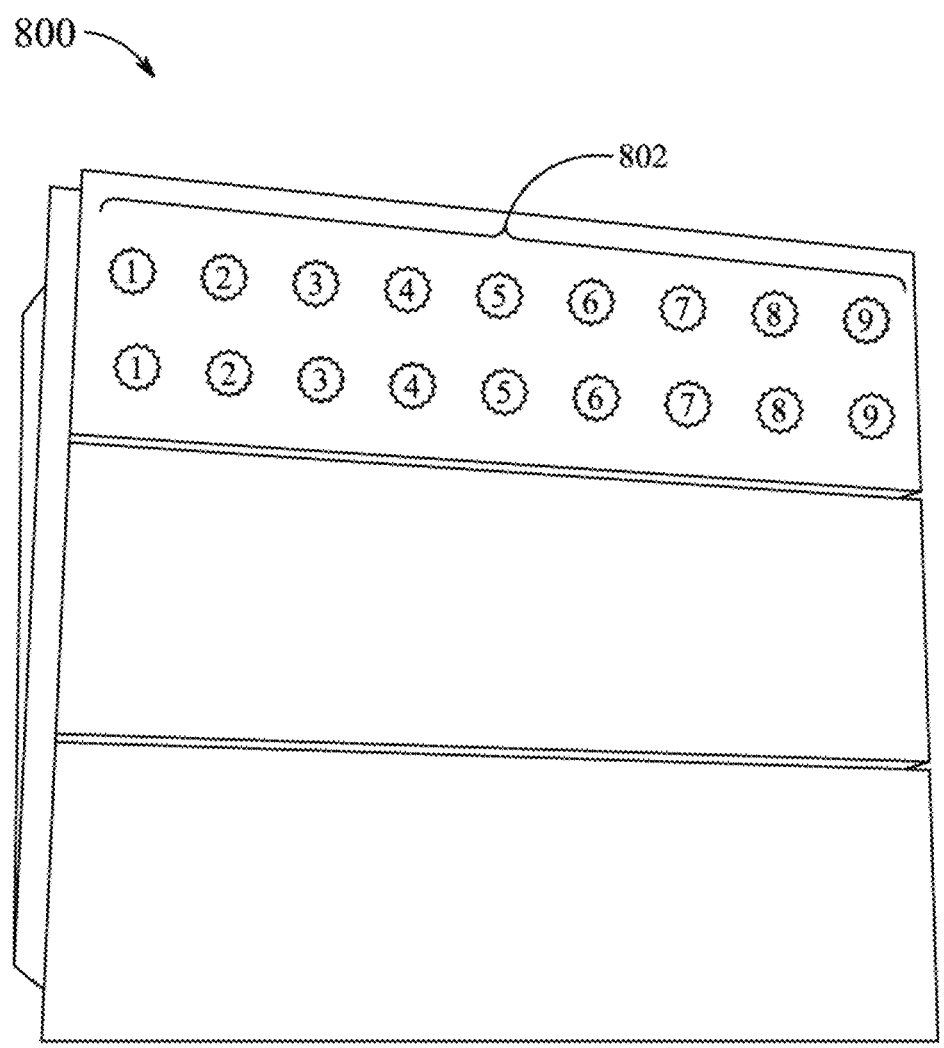
FIG. 8 shows reading locations along a length of a steel reinforcement of a concrete beam sample, according to exemplary aspects of the present disclosure.

To allow ease of placement of the transducing transmitter 704 and the transducing receiver 706 on the concrete beam samples, the steel reinforcements at the top zone of the concrete beam sample were covered with top cover and steel reinforcements at the bottom zone were covered with bottom cover. The value or size of the covers were selected to allow ease of placement of the transducing transmitter 704 and the transducing receiver 706 on the sides of concrete beam samples. Further, guide wires were installed on the shear stirrup reinforcements of the concrete beam samples to allow for identification of their location. The guide wires facilitated in identifying junctions where the steel reinforcements interact with the shear stirrup reinforcements. Each junction may be referred to as a reading location. Further, nine reading locations were marked that were used to take the ultrasonic wave readings along the length of the concrete beam samples. FIG. 8 shows reading locations 802 along a length of a steel reinforcement of a concrete beam sample 800.

Figure 9:
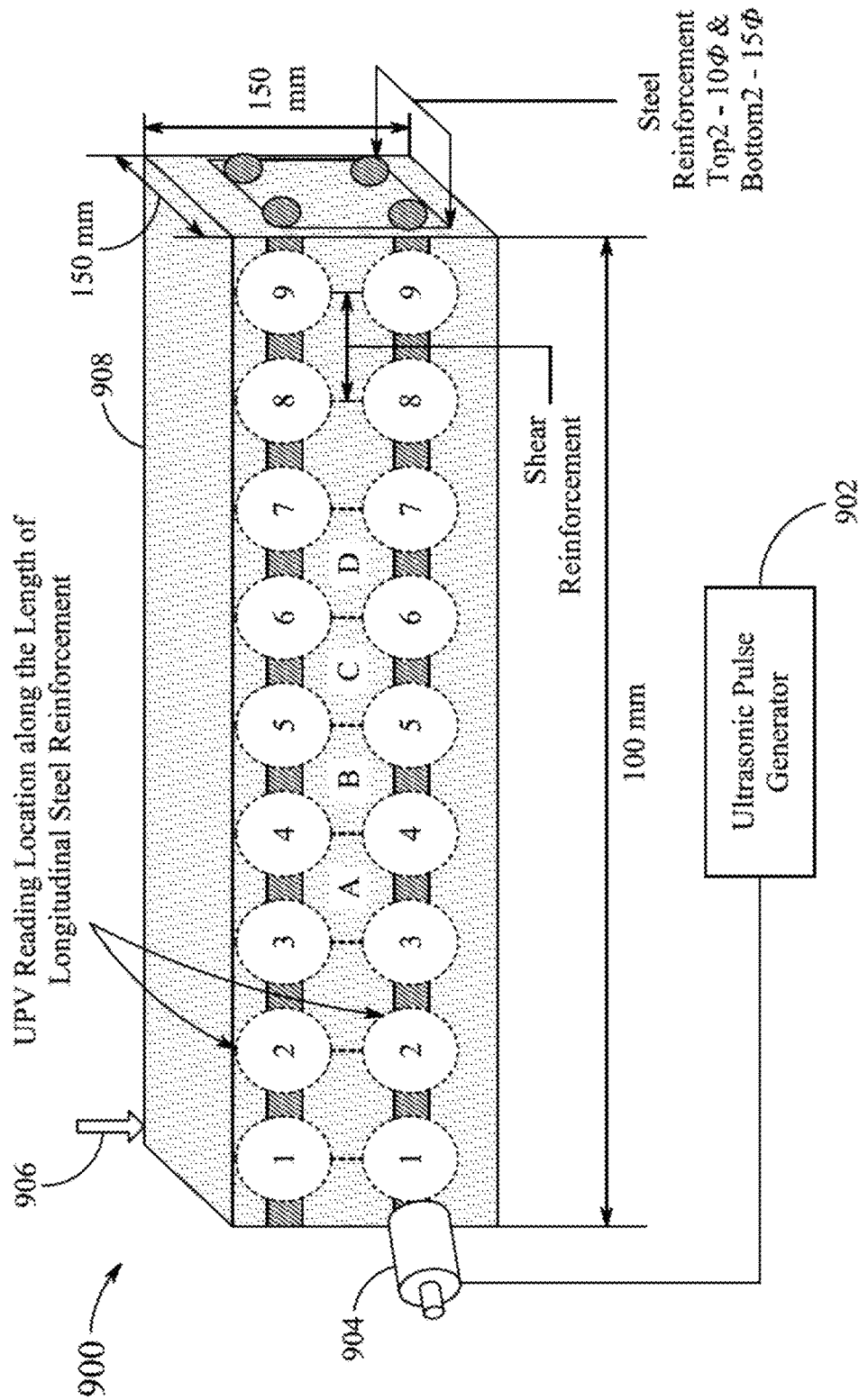
FIG. 9 illustrates an UPV test setup for a concrete beam sample, according to exemplary aspects of the present disclosure.

FIG. 9 illustrates an UPV test setup 900 for a concrete beam sample 908. The UPV testing method was adopted to investigate the quality of bond condition of steel reinforcement embedded into the concrete beam sample 908. As can be seen in FIG. 9, the transducing receiver 904 and the transducing receiver 906 were attached to the concrete beam sample 908. The frequency of the transducing receiver 904 and the transducing receiver 906 was selected to be 60 kHz. Further, nine readings were recorded along a length of steel reinforcement embedded in the concrete beam sample 908. The readings were recorded at a top zone and a bottom zone of the concrete beam sample 908. The pulse velocity of the ultrasonic waves was recoded six times at each reading location. The UPV testing method was employed in periodic cycles to assess the degradation in strength and quality of the concrete beam sample 908. The time for ultrasonic wave propagation through the width of the concrete beam sample 908 was recorded in microseconds and the ultrasonic wave velocity was calculated by dividing the path length with the transit time. The readings were first recorded using a direct method of testing in a neutral condition, i.e., without application of any external loading. The readings recorded in the neutral condition served as a benchmark for the remaining testing. Through the analysis of the recorded readings, weak spots in the bond could be identified along the length of the steel reinforcement embedded in the concrete beam sample. ASTM C597 technical specifications were adhered to record the readings using a direct method of testing.

Two concrete beam samples were tested under flexure loading using ASTM C293-02 technical specifications to estimate the $P_{peak}$ of the concrete beam samples. The $P_{peak}$ was used to perform further testing on the remaining two concrete beam samples. The concrete beam samples were tested by gradually increasing the applied loading. The load was increased in equal increments of 10%. It was observed that the reduction in ultrasonic pulse velocity begins to occur when load level reaches to approximately 10% of the $P_{peak}$. When the load level reaches to approximately 10%, the ultrasonic pulse velocity continues to decrease with the increase in applied loading. This phenomenon can be attributed to crack development, bridging and propagation till the $P_{peak}$ is reached. The average value of the $P_{peak}$ for the two concrete beam samples was recorded as 107.2 KN. In the experimental research, the ultrasonic pulse velocity test results are reported 25% of the $P_{peak}$ at 26.8 KN, 50% of the $P_{peak}$ at 53.6 KN, 75% of the $P_{peak}$ at 80.4 KN, and lastly at 100% of the $P_{peak}$.

Figure 10:
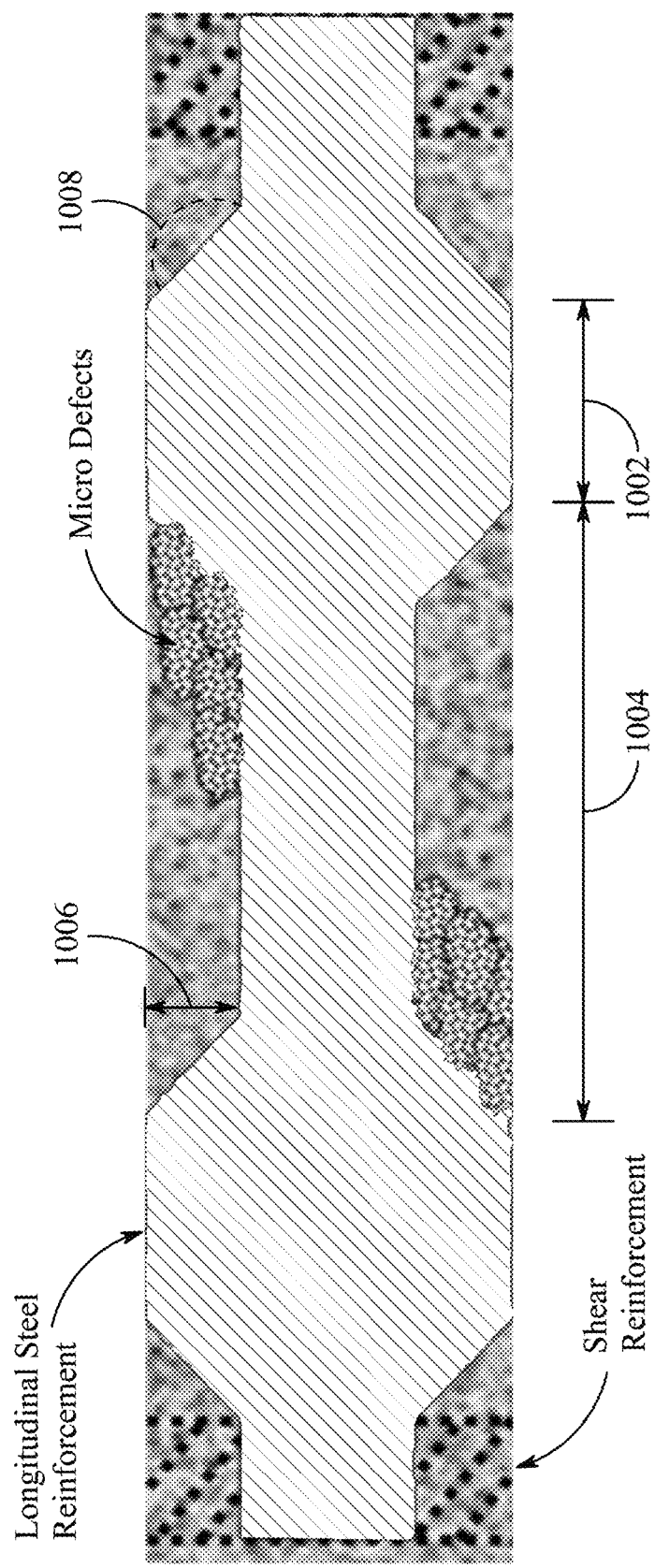
FIG. 10 illustrates factors affecting bond performance of the concrete beam samples, according to exemplary aspects of the present disclosure.

FIG. 10 illustrates factors that affect the bond performance of the concrete beam samples, according to exemplary aspects of the present disclosure.

The factors that affect the bond performance of the concrete beam samples may include steel rib width 1002 (denoted as i), steel rib spacing 1004 (denoted as j), steel rib height 1006 (denoted as k), and steel rib angle: 1008 (denoted as Φ). Furthermore, factors such as steel reinforcement diameter, its cover along with quality of concrete were also taken into consideration. As described earlier, as the applied loading increases, the concrete surrounding the steel reinforcement starts to crack, resulting in degradation of the bond. Further, the degradation of the bond was not uniform along, the length of the steel bar. Some areas where the micro-cracks bridged and propagated showed a larger reduction in pulse velocity whereas other areas where micro-cracks were less prominent showed a lower percentage of pulse velocity degradation. Thus, the bond quality along the length of steel reinforcement was assessed.

In order to eradicate human errors and to standardize the testing protocol, ASTM C597 (2003) technical specifications was followed for all testing. Factors such as concrete strength, age, maximum aggregate size, type of cement, moisture condition, curing, transit path length of the ultrasonic wave, contact between the transducing transmitter 904 and the transducing receiver 906, frequency of the transducing transmitter 904 and the transducing receiver 906, presence of steel reinforcement perpendicular and parallel to the wave propagation path were all taken into consideration. Proper coupling was ensured at each stage for recording readings, and signal shape and strength of received waveform was monitored during testing, and only sinusoidal waveform was recorded. Furthermore, all tests were conducted on reinforced concrete specimens at 38 days of casting in a temperature-controlled laboratory with a temperature variation of 7.5±3° C.

A tabular representation of a set of readings for a bottom zone of four concrete beam samples prior to the application of loading is illustrated in Table 1 provided below.

The set of readings were taken before the application of loading, i.e., in the neutral condition and served as benchmark to compare reading after the applied loading. All the reported readings were taken using the direct method of testing. Further, the concrete beam samples were loaded under equal increments of 10% of $P_{peak}$ till failure and reduction in pulse velocity to travel the same path length was recorded using the direct method of UPV testing. The data provided in Table 1 represents the highest pulse velocity corresponding to the lowest (or shortest) transit time recorded for the ultrasonic wave to travel the fixed path length. Readings for the pulse velocity and transit time wider neutral condition for the top zones of the concrete beam samples are not illustrated in Table 1 for the sake of brevity.

Figure 11:
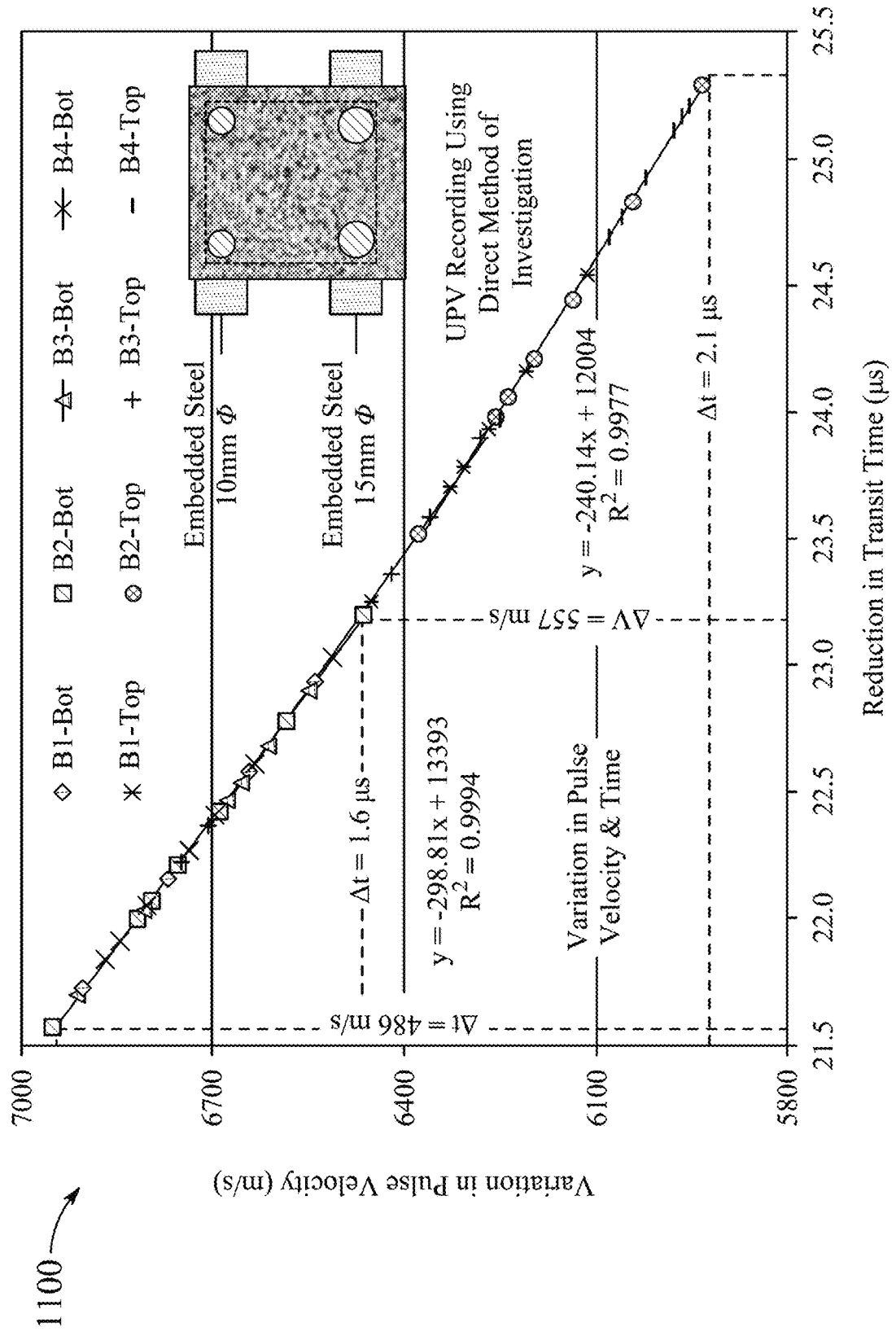
FIG. 11 illustrates a graphical representation of test results for the UPV testing method on the concrete beam samples, according to exemplary aspects of the present disclosure.

FIG. 11 illustrates a graphical representation 1100 of test results for the UPV testing method on the concrete beam samples, according to exemplary aspects of the present disclosure. In particular, the graphical representation 1100 illustrates variation in pulse velocity and transit time before the application of loading under neutral condition for top and bottom zones. In FIG. 11, B1-Top refers to the top zone of the first concrete beam sample, B1-Bottom refers to the bottom zone of the first concrete beam sample, B2-Top refers to the top zone of the second concrete beam sample, B2-Bottom refers to the bottom zone of the second concrete beam sample. B3-Top refers to the top zone of the third concrete beam sample, B3-Bottom refers to the bottom zone of the third concrete beam sample, B4-Top refers to the top zone of the fourth concrete beam sample, and B4-Bottom refers to the bottom zone of the fourth concrete beam sample.

As can be seen in FIG. 11, the vertical axis of the test result represents the pulse velocity in m/s and the horizontal axis of the represents the transit time in μs. From the test results, it is evident that average pulse velocity is above the reference pulse velocity (i.e., above 5000 m/s) indicating a good quality concrete. Further, the variation in transit time along the length of the steel reinforcements of the concrete beam samples is 2.1 μs which indicates a good bond condition.

Further, from the test results, it is evident that for bottom zone the wave transit velocity is slightly faster than the wave transit velocity through the top zone. The reason for this can be attributed to the presence of larger diameter steel reinforcement in the bottom zone, since the ultrasonic wave transits faster through the steel reinforcement and a loss in wave signal strength occurs because of the interface of steel and concrete, hence the portion of wave that transits through the larger diameter steel reinforcement is larger in the bottom zone as compared to the top zone. It can be seen from

TABLE 1

UPV readings before loading application using direct method of investigation in neutral condition - bottom zone

| Reading Location | T (μs) First Concrete Beam | V(m/s) | T (μs) Second Concrete Beam | V(m/s) | T (μs) Third Concrete Beam | V(m/s) | T (μs) Fourth Concrete Beam | V(m/s) |
|---|---|---|---|---|---|---|---|---|
| 1 | 22.4 | 6707 | 22.2 | 6754 | 22.7 | 6614 | 22.1 | 6803 |
| 2 | 22.2 | 6750 | 22.1 | 6798 | 22.5 | 6656 | 21.9 | 6846 |
| 3 | 22.6 | 6644 | 22.4 | 6691 | 22.9 | 6551 | 22.3 | 6739 |
| 4 | 22.4 | 6707 | 22.2 | 6754 | 22.7 | 6614 | 22.1 | 6803 |
| 5 | 22.4 | 6707 | 22.2 | 6754 | 22.7 | 6614 | 22.1 | 6803 |
| 6 | 22.4 | 6696 | 23.2 | 6467 | 21.7 | 6912 | 23.0 | 6513 |
| 7 | 22.9 | 6541 | 22.8 | 6587 | 23.2 | 6466 | 22.6 | 6634 |
| 8 | 21.7 | 6904 | 21.6 | 6953 | 22.0 | 6808 | 22.4 | 6696 |
| 9 | 22.2 | 6771 | 22.0 | 6819 | 22.5 | 6677 | 21.8 | 6868 | the result that the variation in the transit time for the top and bottom zone is 2.1 µs and 1.6 µs, respectively, and the velocity for the wave propagation for all zones is above 6500 m/s which indicates a perfect bond condition and a good quality concrete. Since it is known that the ultrasonic pulse travels 1.4 to 1.7 times faster in steel as compared to concrete hence correction factors for two types of steel reinforcements present in the transit path of the pulse velocity were calculated using the iterative process. These correction factors were chosen as 0.965 for $L_s/L$ ratio of 1/5 for steel reinforcement perpendicular to the path of transit and 0.92 for $L_s/L$ ratio of 1/10 for steel reinforcement parallel to the path of wave transit corresponding to very good quality concrete with the reference pulse velocity of 6500 m/s. Further, all testing was conducted on air dried samples in a temperature-controlled laboratory, and only the stable pulse velocity readings corresponding to sinusoidal wave were recorded.

A tabular representation of a set of readings for the bottom zone of four concrete beam samples after the application of incremental loading is illustrated in Table 2 provided below.

TABLE 2

UPV readings for bottom zone after the application of incremental loading measured via the direct method

| Reading Location | T (µs) 0.25 $P_{peak}$ | V(m/s) | T (µs) 0.50 $P_{peak}$ | V(m/s) | T (µs) 0.75 $P_{peak}$ | V(m/s) | T (µs) $P_{peak}$ | V(m/s) |
|---|---|---|---|---|---|---|---|---|
| 1 | 28.0 | 5355 | 28.3 | 5295 | 29.2 | 5142 | 31.63 | 4742 |
| 2 | 28.0 | 5355 | 28.9 | 5185 | 30.4 | 4939 | 32.63 | 4597 |
| 3 | 28.5 | 5261 | 29.1 | 5149 | 29.5 | 5090 | 33.43 | 4487 |
| 4 | 29.0 | 5099 | 30.1 | 4978 | 31.1 | 4828 | 34.43 | 4357 |
| 5 | 30.3 | 4889 | 29.9 | 4988 | 34.1 | 4317 | 35.83 | 4186 |
| 6 | 29.4 | 5100 | 30.9 | 4850 | 31.9 | 4651 | 34.03 | 4408 |
| 7 | 28.6 | 5243 | 29.2 | 5132 | 30.3 | 4955 | 32.43 | 4625 |
| 8 | 29.0 | 5171 | 28.7 | 5221 | 29.3 | 5125 | 31.23 | 4803 |
| 9 | 27.4 | 5472 | 28.8 | 5203 | 30.3 | 4955 | 30.03 | 4995 |

The data provided in Table 2 represents the reduction in pulse velocity (m/s) corresponding to the application of incremental loading measured via the direct method of testing.

Figure 12:
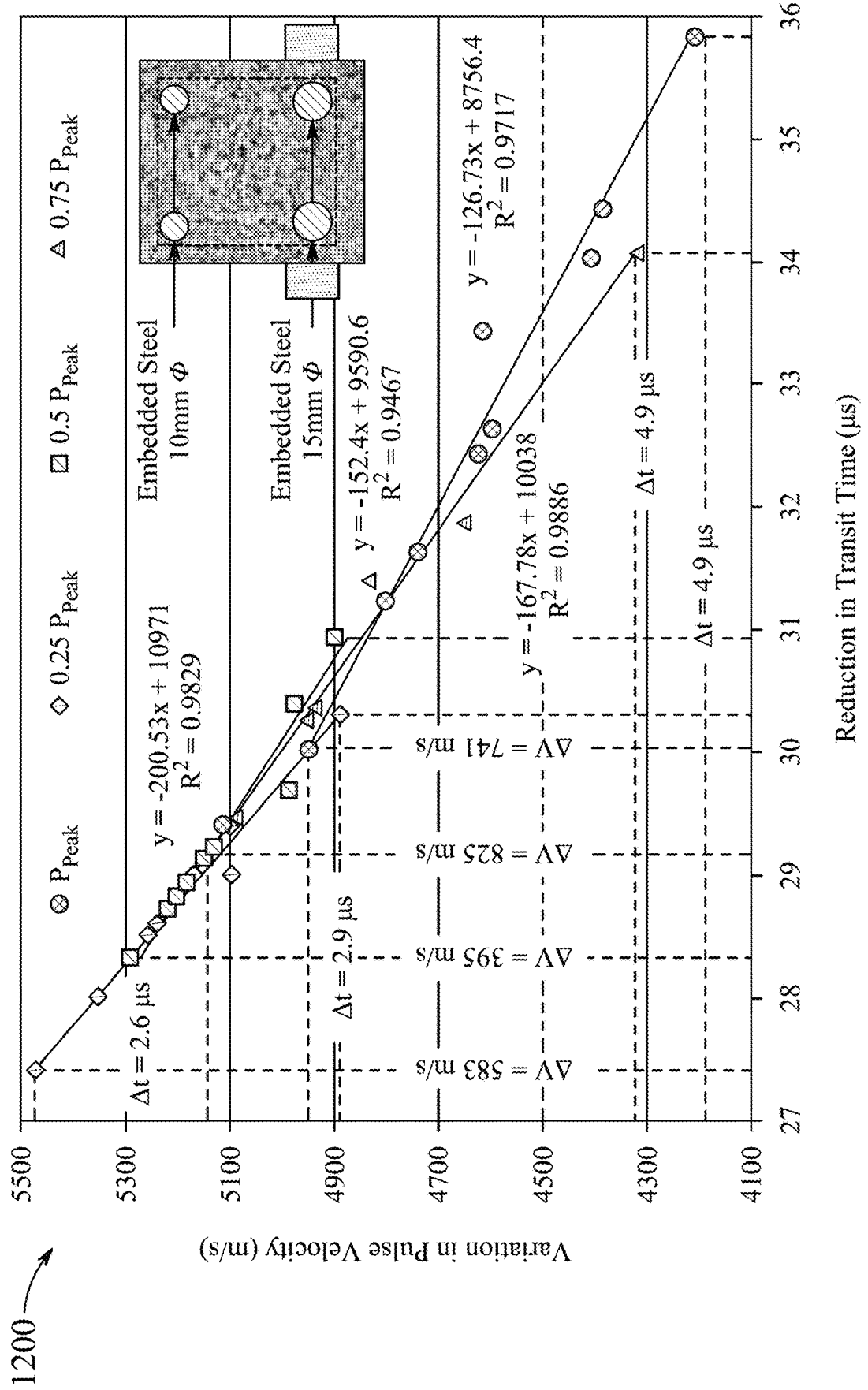
FIG. 12 illustrates a graphical representation showing the decrease in the pulse velocity with the increase in the applied loading, according to exemplary aspects of the present disclosure.

FIG. 12 illustrates a graphical representation 1200 showing the decrease in the pulse velocity with the increase in the applied loading. As can be seen in FIG. 12, as the applied loading increases the pulse velocity starts to decrease. This can be attributed to the degradation in bond quality of steel reinforcement as the concrete surrounding the steel refinement starts to crack. Further, although there is a consistent decrease in the pulse velocity; however, for loadings of 25% of $P_{peak}$ and 50% of $P_{peak}$ the range is almost consistent. As may be understood, once the cracks start to develop these cracks do not have enough length to bridge together and start propagating, however as the loading is increased to 75% of $P_{peak}$ these cracks start bridging together with other cracks in the vicinity which resulted in larger drop in the pulse velocity.

A tabular representation of percentage decrease in the pulse velocity with respect to increase in applied loading is illustrated in Table 3 provided below.

TABLE 3

Percentage reduction in pulse velocity with respect to to neutral condition (bottom zone – direct method)

| Loading Range (%) | Range of Pulse Velocity (m/s) | Reduction in Pulse Velocity (m/s) | % Reduction w.r.t Neutral (%) | % Reduction w.r.t $P_{peak}$ (%) | Loading Range (%) |
|---|---|---|---|---|---|
| Neutral | 6953 | 6467 | 486 | — | 34.91 |
| 0~25 | 5472 | 4889 | 583 | 24.40 | 13.91 |
| 25~50 | 5295 | 4900 | 395 | 24.23 | 14.10 |
| 50~75 | 5142 | 4317 | 825 | 33.24 | 2.50 |
| $P_{peak}$ | 4950 | 4209 | 741 | 34.91 | — |

Figure 13:
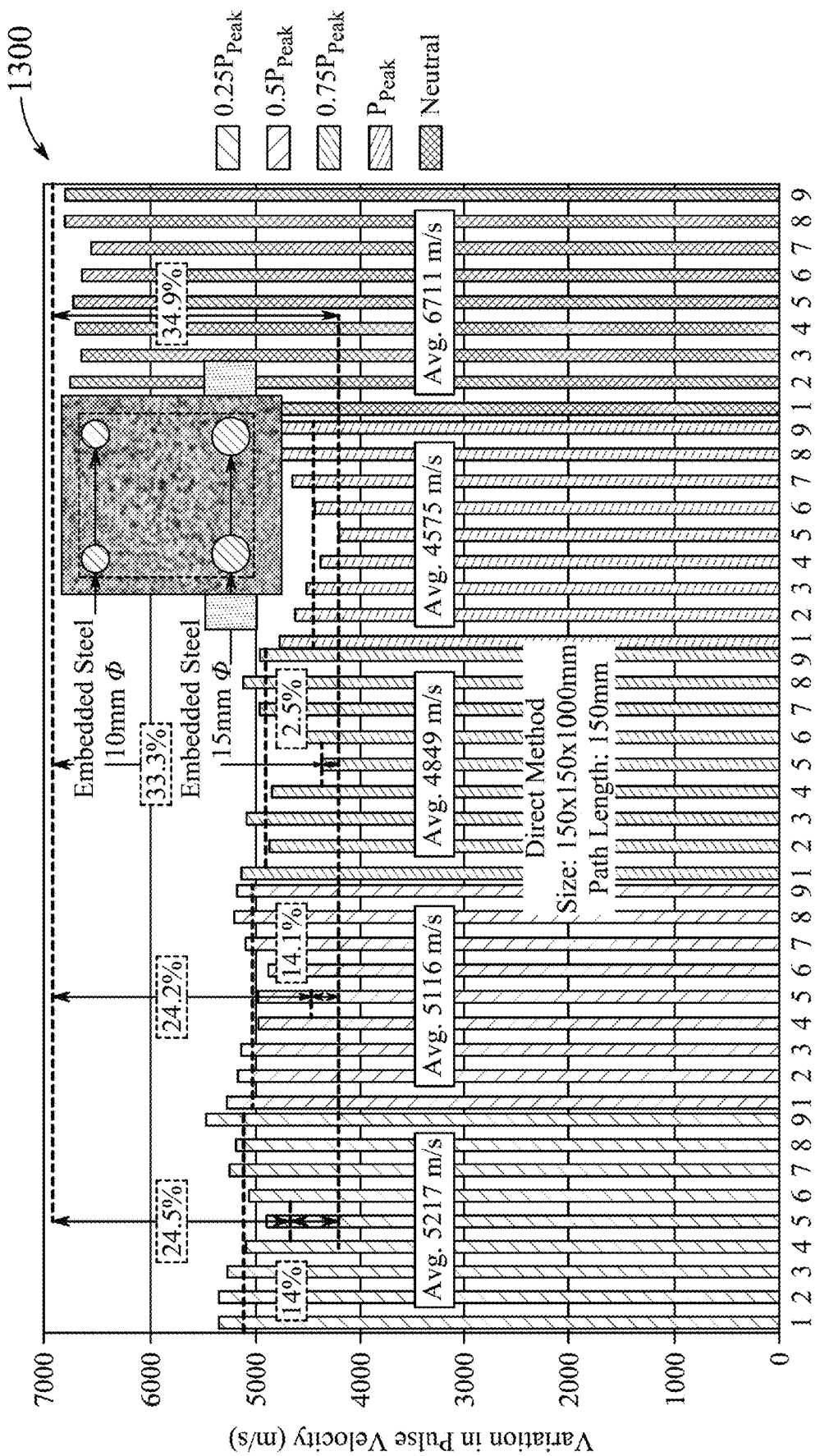
FIG. 13 illustrates a graphical representation of reduction in pulse velocity with the increase in the applied loading in the concrete beam samples, according to exemplary aspects of the present disclosure.

Table 3 presents the percentage decrease in the pulse velocity with respect to an increase in applied loading. The pulse velocity decreased by approximately 25% for 25% of $P_{peak}$ and 50% of $P_{peak}$ while a larger drop of 33% and 35% in pulse velocity occurred after the application of of $P_{peak}$ and $P_{peak}$. Accordingly, in the ranges of 25% of $P_{peak}$ and 50% of $P_{peak}$, the concrete in the vicinity of steel reinforcement starts to develop cracks, however these cracks are small in length and are not bridged with other adjacent cracks. As the loading is increased to 75% of $P_{peak}$ and $P_{peak}$ these cracks bridge together with adjacent cracks and start to propagate resulting in a significant drop in velocity. FIG. 13 illustrates a graphical representation 1300 of reduction in pulse velocity along the length of steel reinforcement embedded in concrete with an increase in applied loading in comparison to neutral condition for the bottom zone.

Figure 14:
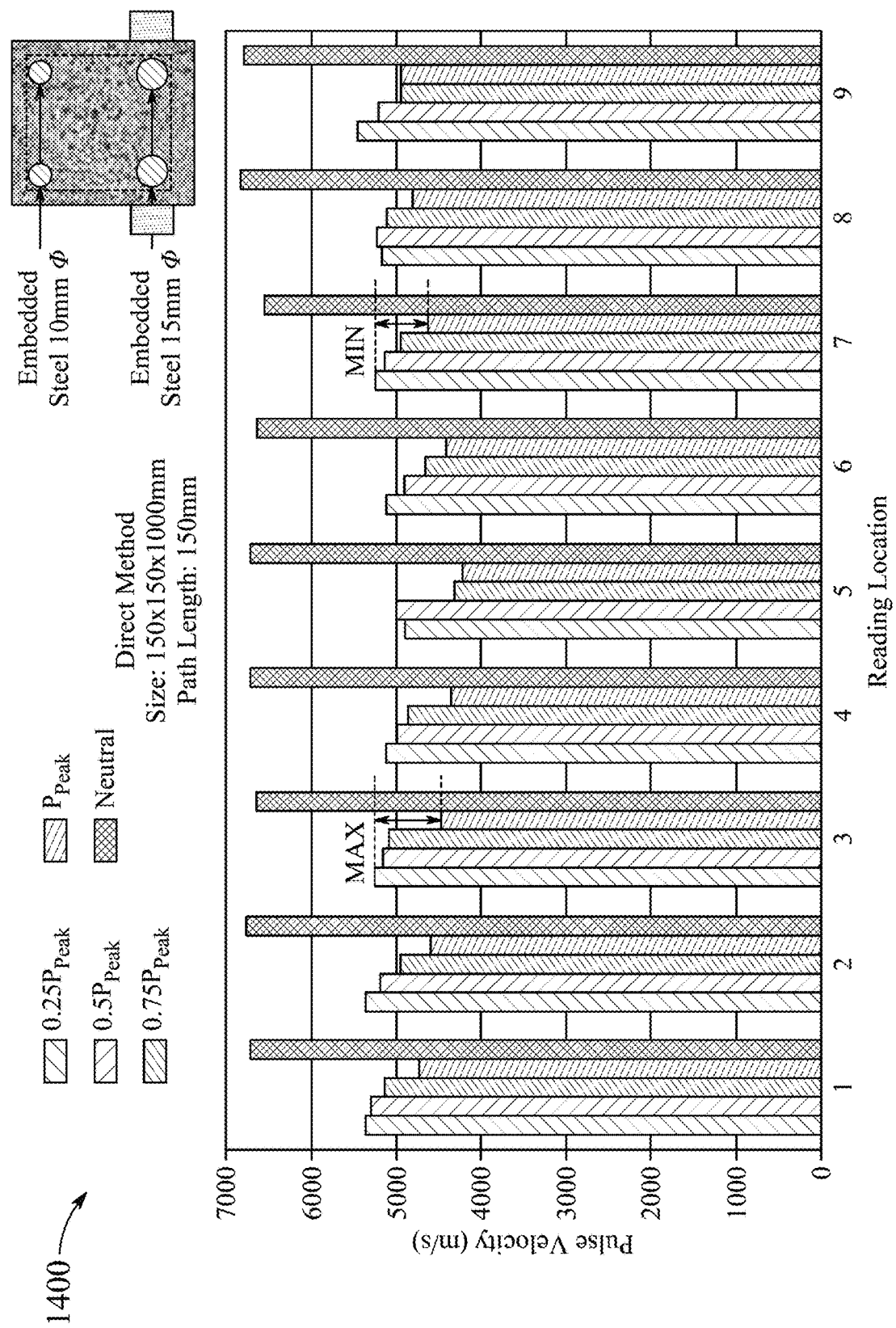
FIG. 14 illustrates a graphical representation of variation pulse velocity, along the length of steel reinforcement, according to exemplary aspects of the present disclosure.

FIG. 14 illustrates a graphical representation 1400 of variation in pulse velocity along the length of steel reinforcement. The nine reading locations marked along the length of the reinforcement indicate the bond condition for each incremental loading. As can be seen in FIG. 14, at each stage, the pulse velocity continues to decrease with the increase in loading. As can be seen that the third reading location has the highest drop in pulse velocity owing to crack development in the concrete surrounding the steel reinforcement, while the seventh reading location resulted in the minimum bond degradation depicting lower cracking.

A tabular representation of a set of readings for top zone of concrete beam samples after the application of incremental loading is illustrated in Table 4 provided below.

TABLE 4

UPV readings for top zone after the application of incremental loading measured via direct method

| Reading Location | T (µs) $0.25\ P_{peak}$ | V(m/s) | T (µs) $0.50\ P_{peak}$ | V(m/s) | T (µs) $0.75\ P_{peak}$ | V(m/s) | T (µs) $P_{peak}$ | V(m/s) |
|---|---|---|---|---|---|---|---|---|
| 1 | 31.5 | 4766 | 31.7 | 4732 | 31.6 | 4805 | 32.2 | 4701 |
| 2 | 31.3 | 4792 | 31.4 | 4816 | 31.7 | 4773 | 32.9 | 4563 |
| 3 | 32.0 | 4687 | 31.9 | 4702 | 32.2 | 4695 | 32.8 | 4577 |
| 4 | 31.5 | 4770 | 31.3 | 4797 | 32.4 | 4651 | 32.1 | 4667 |
| 5 | 31.5 | 4760 | 32.1 | 4677 | 31.2 | 4838 | 33.1 | 4536 |
| 6 | 30.6 | 4903 | 32.1 | 4668 | 31.7 | 4769 | 32.5 | 4620 |
| 7 | 32.3 | 4643 | 31.7 | 4734 | 31.5 | 4769 | 32.3 | 4648 |
| 8 | 30.9 | 4862 | 31.7 | 4678 | 32.9 | 4574 | 32.7 | 4591 |
| 9 | 31.2 | 4816 | 32.1 | 4668 | 32.7 | 4601 | 33.2 | 4490 |

The data presented in Table 4 depicts the reduction in pulse velocity corresponding to the application of incremental loading measured via direct method of testing.

Figure 15:
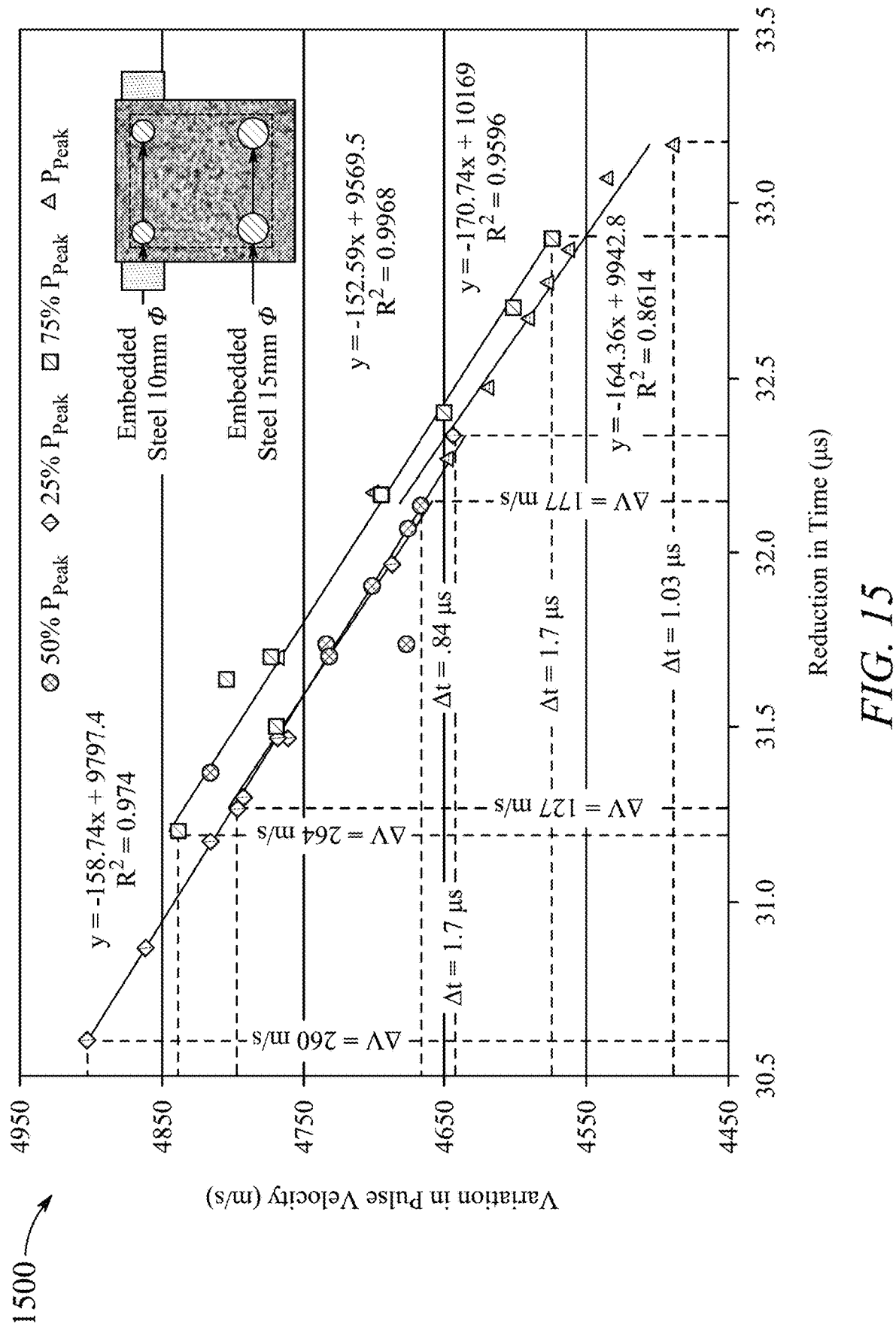
FIG. 15 illustrates a graphical representation of reduction in pulse velocity reading after the application of loading increment for top zone, according to exemplary aspects of the present disclosure.

FIG. 15 illustrates a graphical representation 1500 of reduction in pulse velocity reading after the application of loading increment for the top zone. As can be seen from FIG. 15, as the applied loading increases, the pulse velocity starts to reduce. However, after the initial drop in pulse velocity values, there is gradual reduction in velocity. The presence of cracks coupled with the increase in pulse velocity and transit time for the same path length indicates the degradation in bond quality of the embedded steel reinforcement. However, the reduction in pulse velocity for the top zone is lower as compared to the bottom zone as the top zone experienced less cracking, as compared to the bottom zone.

Figure 16:
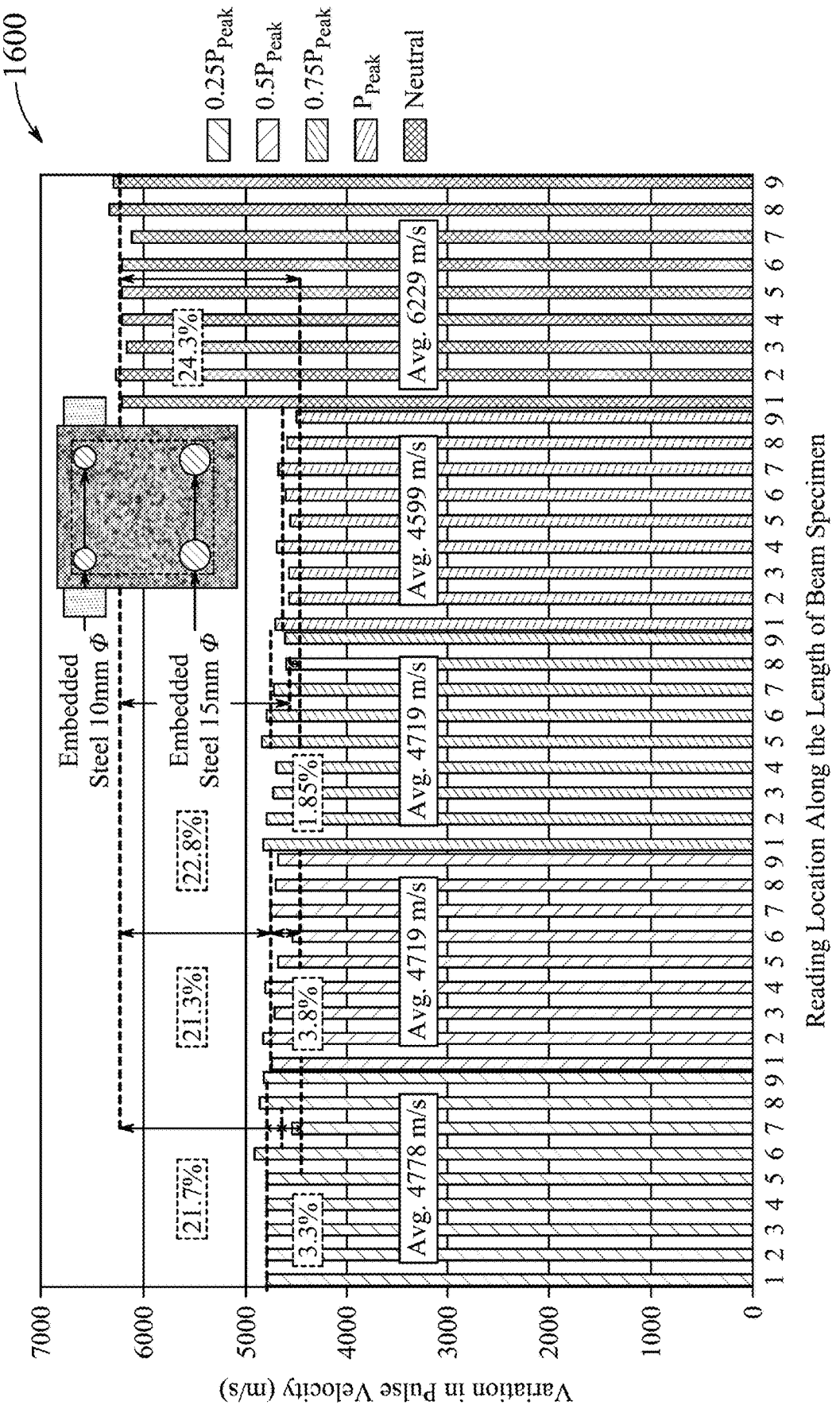
FIG. 16 illustrates a graphical representation of variation in the pulse velocity after the application of loading, according to exemplary aspects of the present disclosure.

FIG. 16 illustrates a graphical representation 1600 of variation in pulse velocity after the application of loading. In particular, FIG. 16 illustrates reduction in pulse velocity along the length of steel reinforcement embedded in concrete beam samples with increase in applied loading in comparison to neutral condition for top zone. As shown FIG. 16, there is approximately 22% decrease in pulse velocity for 25% of $P_{peak}$ followed by 72% and 73% reduction for 50% and 75% of $P_{peak}$ loading application, while the largest drop occurs after the application of $P_{peak}$ at 24.5%.

Figure 17:
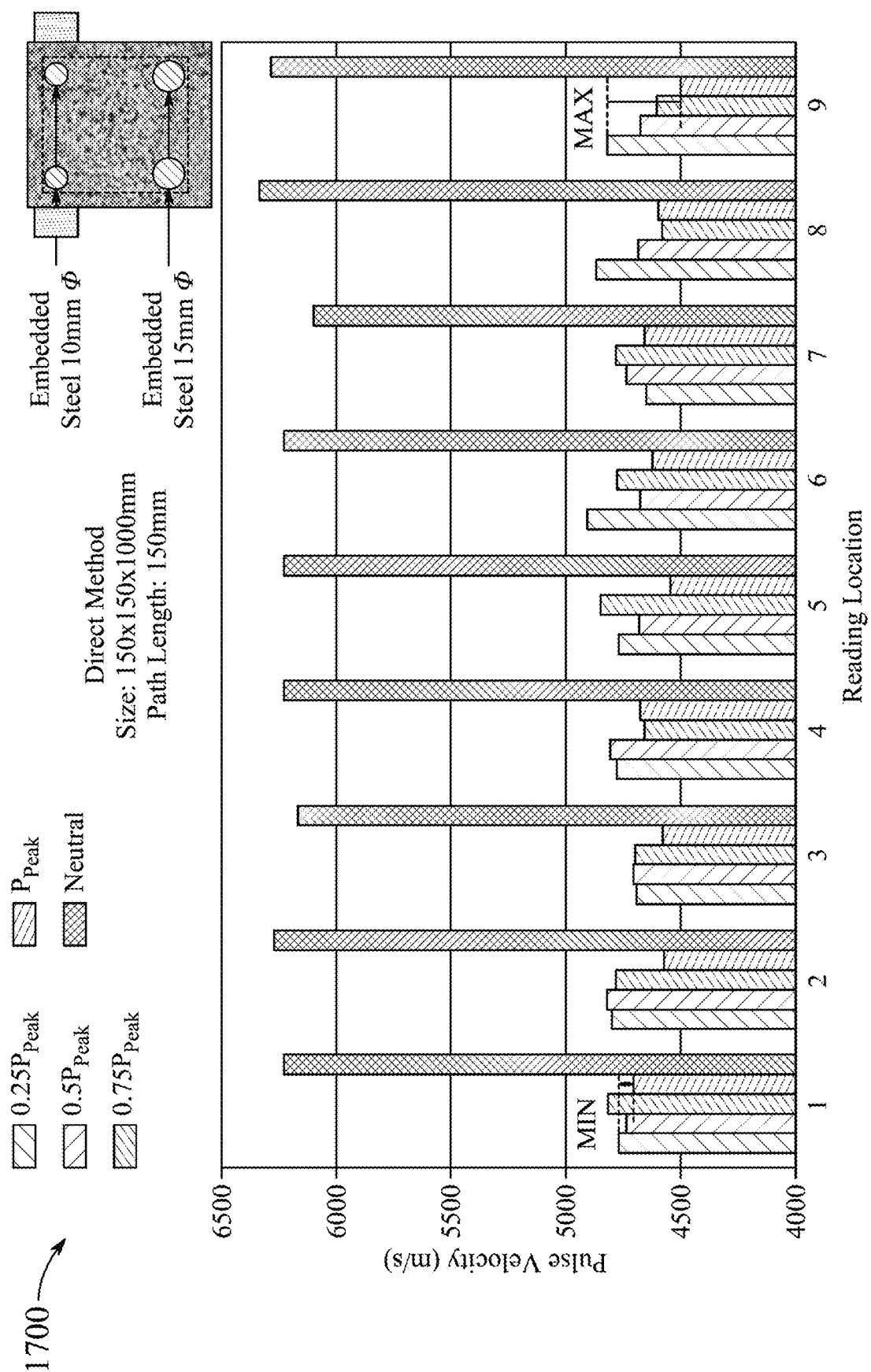
FIG. 17 illustrates a graphical representation of variation in the pulse velocity with increase in applied loading, according to exemplary aspects of the present disclosure.

FIG. 17 illustrates a graphical representation 1700 of variation pulse velocity along the length of steel reinforcement. In particular, FIG. 17 illustrates variation in pulse velocity along the length of steel reinforcement embedded in concrete beam samples for top zone with the application of incremental loading. From the analysis of the results shown in FIG. 17 it is evident that the UPV testing method can be used to identify the locations of weak bond along the length of steel reinforcement embedded in concrete beam sample. It can be seen from FIG. 17 that the maximum drop in pulse velocity occurs at ninth reading location along the steel reinforcement.

Figure 18B:
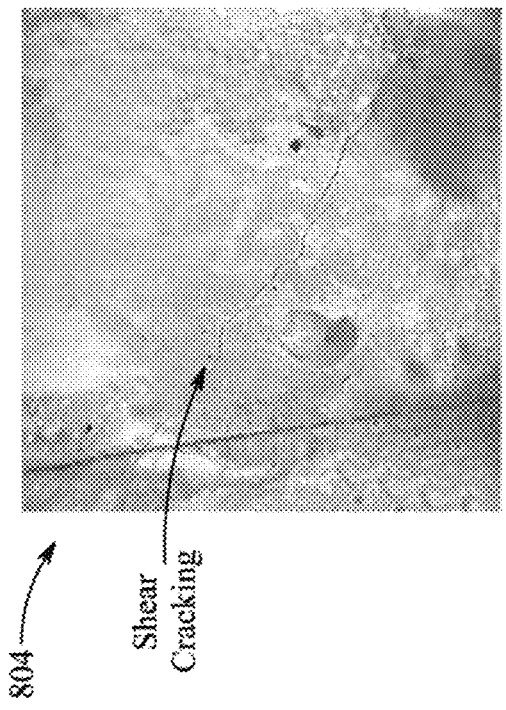
FIG. 18B illustrates a side view of the cracking pattern for the concrete beam sample, according to exemplary aspects of the present disclosure.
Figure 18C:
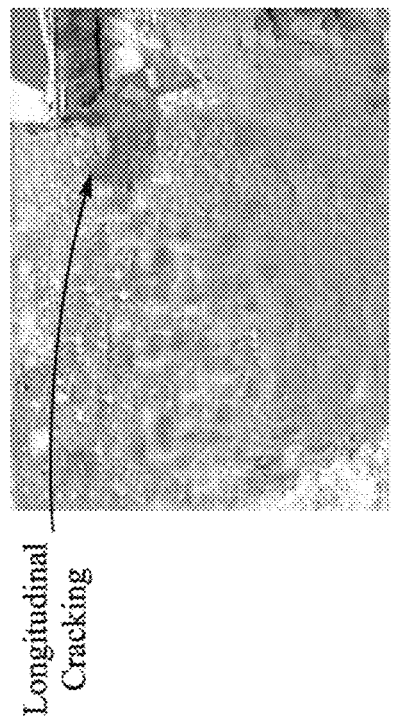
FIG. 18C illustrates a bottom view of the cracking pattern for the concrete beam sample, according to exemplary aspects of the present disclosure.
Figure 18A:
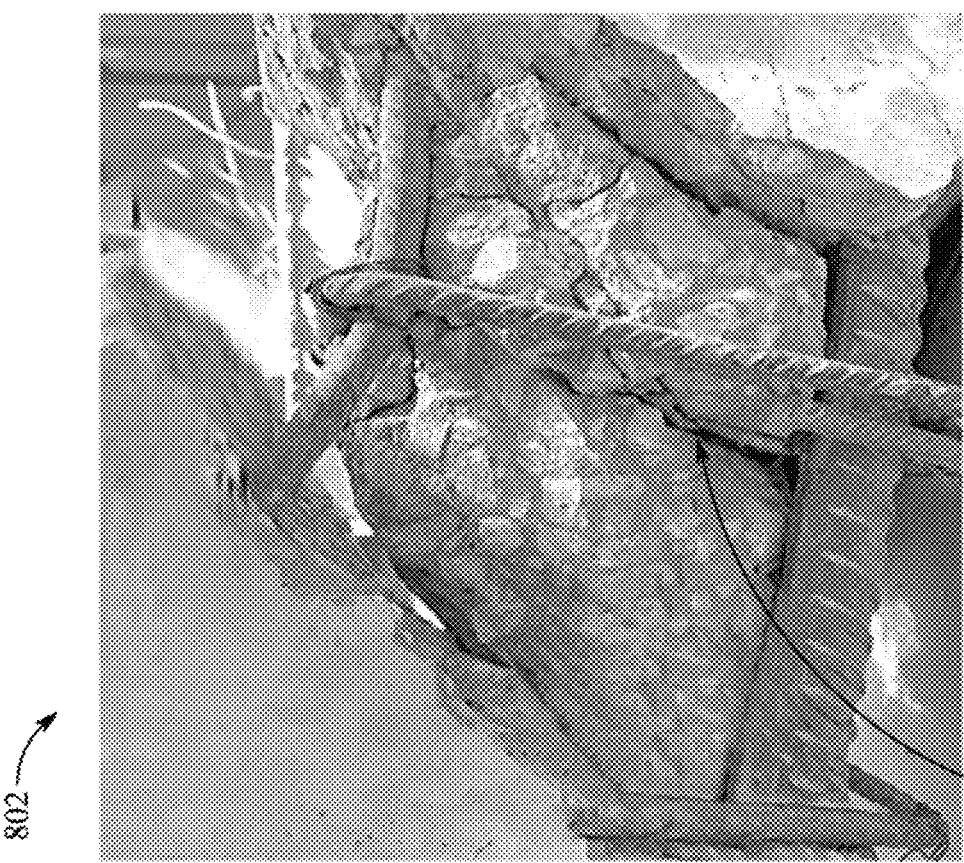
FIG. 18A illustrates a cross-sectional view of a cracking pattern for a concrete beam sample, according to exemplary aspects of the present disclosure.

FIG. 18A illustrates a cross-sectional view 802 of internal cracking in a concrete beam sample, FIG. 18B illustrates a side view 804 of shear cracking in the concrete beam sample, and FIG. 18C illustrates a bottom view 806 of longitudinal cracking in the concrete beam sample, according to exemplary aspects of the present disclosure.

Figures 18D, 18E, 18F:
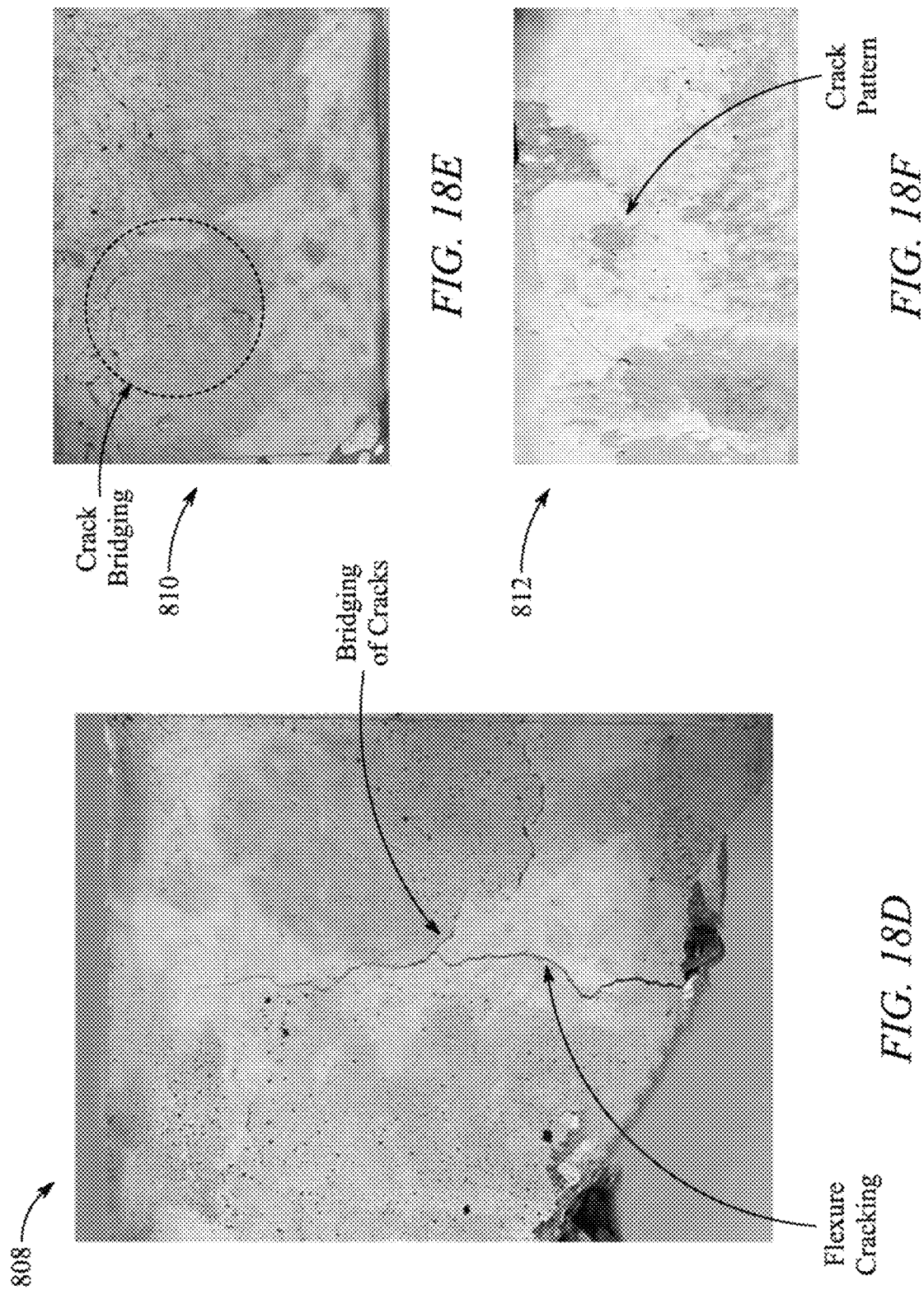
FIG. 18D illustrates a cross-sectional view of a cracking pattern for a concrete beam sample, according to exemplary aspects of the present disclosure.
FIG. 18E illustrates a bottom view of the cracking pattern for the concrete beam sample, according to exemplary aspects of the present disclosure.
FIG. 18F illustrates a side view of the cracking pattern for the concrete beam sample, according to exemplary aspects of the present disclosure.

FIG. 18D illustrates a cross-sectional view 808 of flexure cracking and bridging of cracks for a concrete beam sample, FIG. 18E illustrates a bottom view of bridging of cracks, and FIG. 18F illustrates a side view of the cracking pattern for the concrete beam sample, according to exemplary aspects of the present disclosure. The reduction in pulse velocity coupled with the presence of crack bridging as shown in FIGS. 18D-18F indicate the degradation in bond condition.

It was observed from the experimentation that as the cracks developed in the concrete beam samples, the pulse velocity reduced for the same path length. The reduction in pulse velocity was used to identify the initiation, development, and propagation of internal micro-cracks along the length of steel reinforcements in the concrete beam samples. Using the UPV testing method, areas of bond degradation along the length of steel reinforcements embedded in the concrete beam samples could be successfully identified. By adopting the direct method for testing for bottom zone, 24.4%, 24.3%, 33.4% and 35% reduction in pulse velocity was recorded in comparison to neutral unloaded condition for increase in loading to 25% of $P_{peak}$, 50% of $P_{peak}$, 75% of $P_{peak}$ and $P_{peak}$ respectively. Also, for the top zone, 22%, 21.5%, 23% and 25% reduction in pulse velocity was recorded in comparison to neutral unloaded condition for increase in loading to 25% of $P_{peak}$, 50% of $P_{peak}$ 75% of $P_{peak}$ and $P_{peak}$ respectively.

Also, based on the bond condition of the concrete beam samples, localized repairs of the concrete beams can be carried out, thereby resulting in the reduction of time, cost, and labor needed for strengthening or maintenance of the concrete beams. Furthermore, the UPV testing method can be employed as a stand-alone tool and can also be used in conjunction with other non-destructive tests for increasing the accuracy of on-site investigation.

In aspects of the present disclosure, a multi-layer feed-forward back propagation perceptron artificial neural network is developed in order to avoid simplification assumptions for developing models to predict the cracking, owing to the non-linear complex stress distribution at the steel-concrete interface. The artificial neural network is used to predict the crack width and to conduct sensitivity analysis of the various factors influencing the bond deterioration. A high accuracy level is achieved between the predicted and the experimental values with R2 of 0.97 and the most influential parameter is highlighted.

Figure 19:
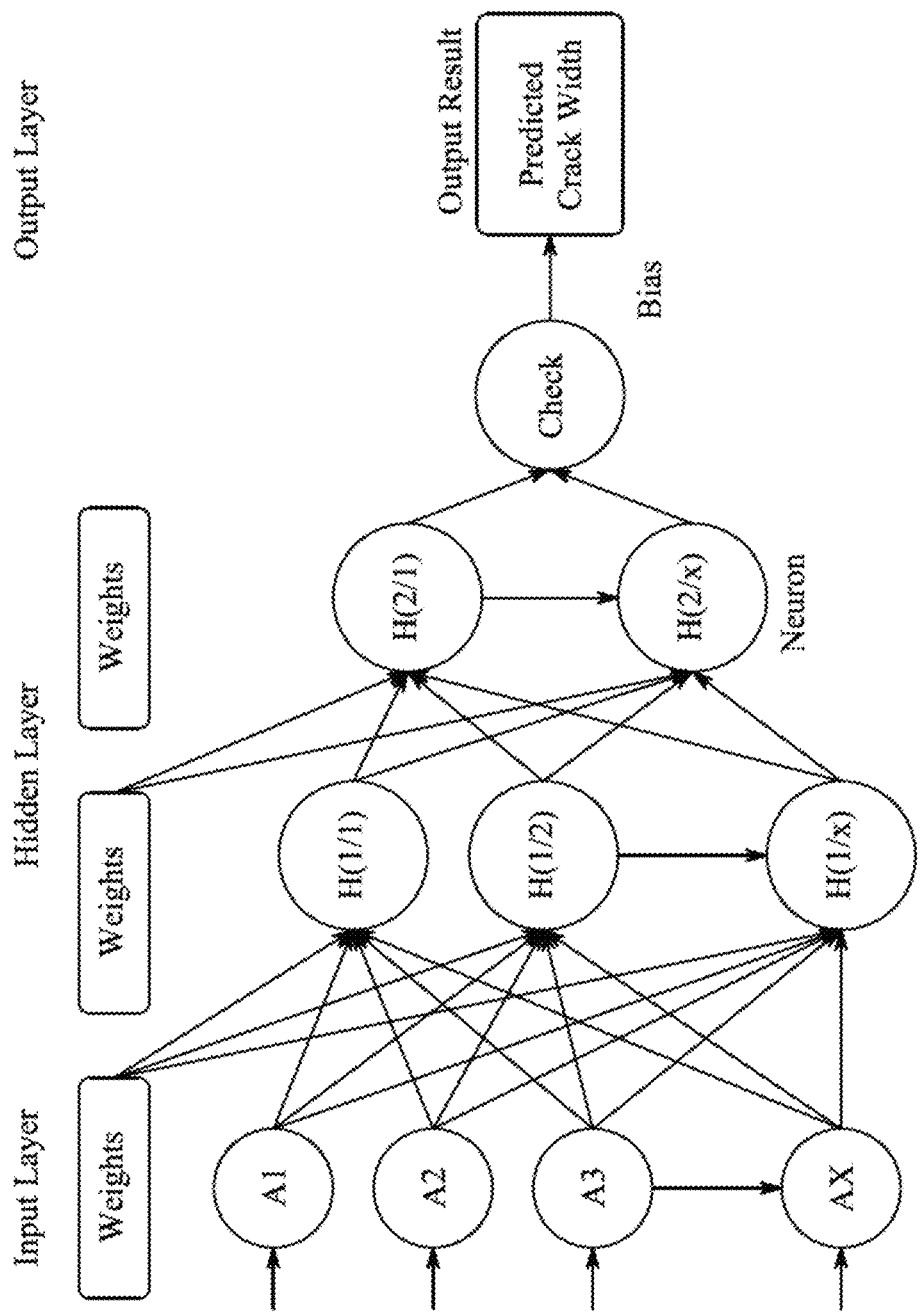
FIG. 19 illustrates the architecture of a feed-forward artificial multi-layer perceptron network
Figure 20:
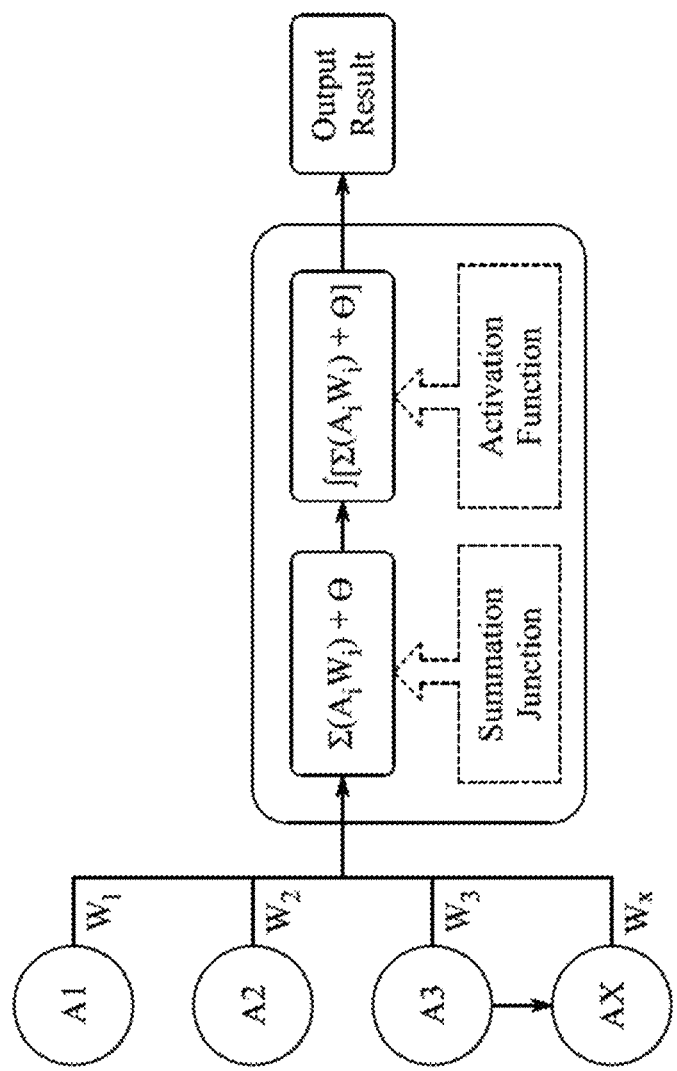
FIG. 20 shows a chart depicting single neuron's activity, according to exemplary aspects of the present disclosure.

FIG. 19 depicts the architecture of a feed-forward multi-layer perceptron artificial neural network. The network uses back-propagation algorithm learning process to develop relationship between data, recognize patterns and works as a black-box model-free tool. Each network is composed of multiple layers consisting of an input layer, hidden layer/layers and an output layer. Each layer contains several interconnected neurons that receive weighted inputs which are summed and passed through the activation function to produce the single desired output value as shown in FIG. 20. The activation functions typically have a sigmoidal shape;

however, they can adopt non-linear functionality as well. The general operational mode for the three-layer-feed-forward back propagation perceptron artificial neural network is as presented in the below equations.

$$I_I = f\left\{\sum_{x=1}^{N}(\Theta_{x,I}.i_x) + b_I\right\} \quad (1)$$

$$O_o = f\left\{\sum_{x=1}^{N}(O_{I,O}.H_I) + b_O\right\} \quad (2)$$

$$\psi(a_I) = \frac{\exp(a_I)}{\sum_{x=1}^{I}\exp(a_I)} \quad (3)$$

In the above equations, f { } represents the activation function. $i_x$ is the normalized input from the neuron at the $x^{th}$ location, $I_I$ represents the processing activity at the $I^{th}$ neuron. Whereas $O_o$ is the output processing activity at the output neuron. $O_{x,I}$ and $O_{I,o}$ are the weightages on the connections at the $I^{th}$ input neuron and $O^{th}$ output neuron respectively while $b_I$ and $b_o$ are the weighted biases at the input and output neurons. An ANN can consist of several hidden layers. All the neurons in the layers are interconnected as shown in FIG. 19. The role of weighted biases on the hidden and input neurons is to allow for achieving the desired weightages at the output value. The value of these biases ranges from 1 to any suitable constant among the connected layers. The IBM SPSS (2017) package was adopted for statistical analysis and neural network while back-propagation was adopted to conduct supervised training of the ANN. A softmax function as shown in (3) was employed to transform real-valued arguments to 0 to 1 and summation of 1 as an activation function in the output layer. Softmax is a mathematical function used for converting a vector of number into probability vectors with proportionality to the scale of each value in the vector. This function is applied in machine learning as the activation function since ANN requires an activation function in the output layer for making prediction. This is especially needed for a network configured towards N output values, one for each class in a classification task. This function normalizes the outputs, from the weighted sums to the probabilities which add to one. This value is further interpreted as probability of membership for each class of members. Since ANNs rely upon random number generators for initialization of weightages and sample selection, this can lead to erroneous output from the network on each run-cycle. Hence large number of training run cycles are needed to train the ANN in order to achieve desired results within the allowed tolerances.

Figure 21:
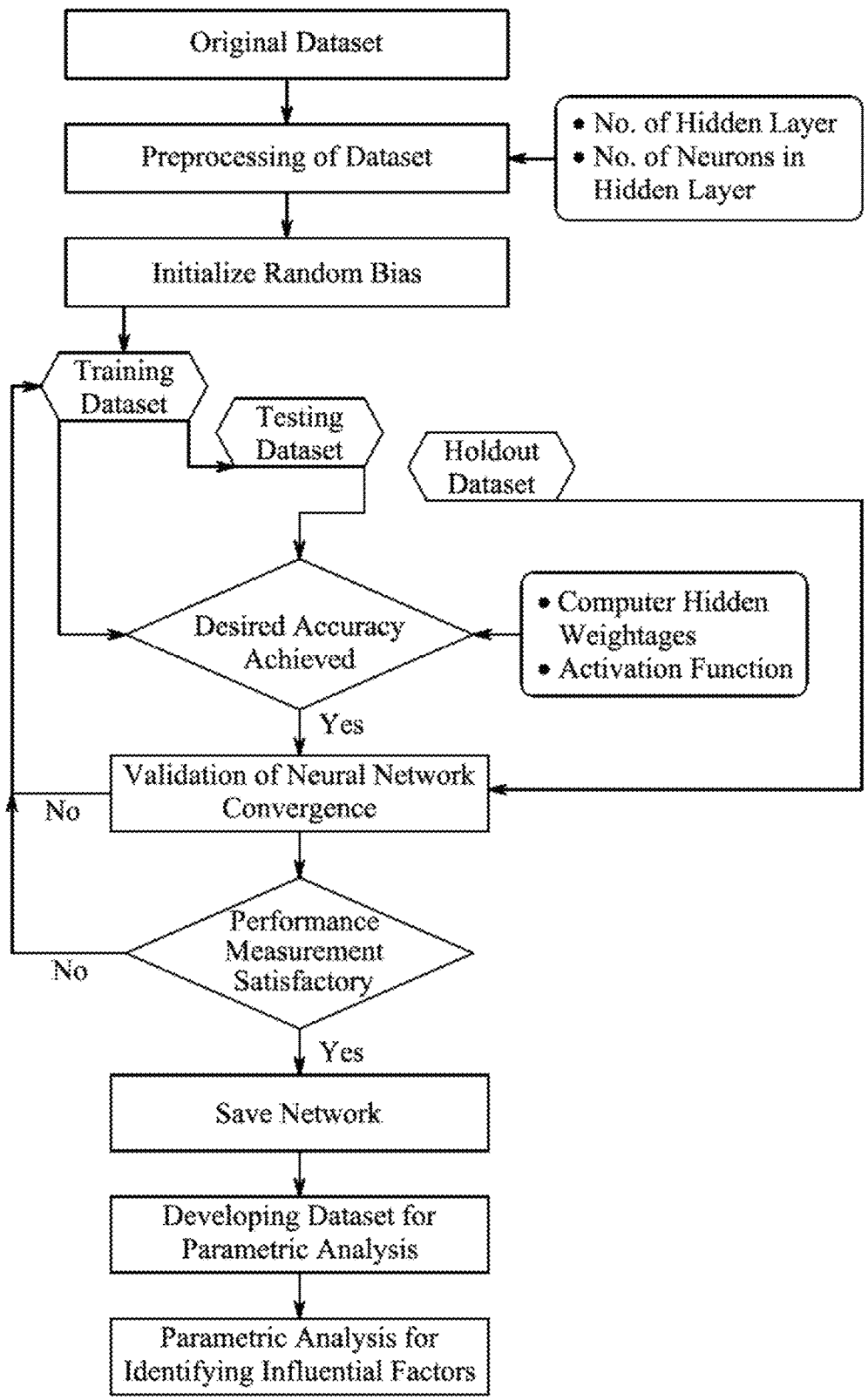
FIG. 21 illustrates a flowchart diagram of the feed-forward artificial multi-layer perceptron network, according to exemplary aspects of the present disclosure.
Figure 22:
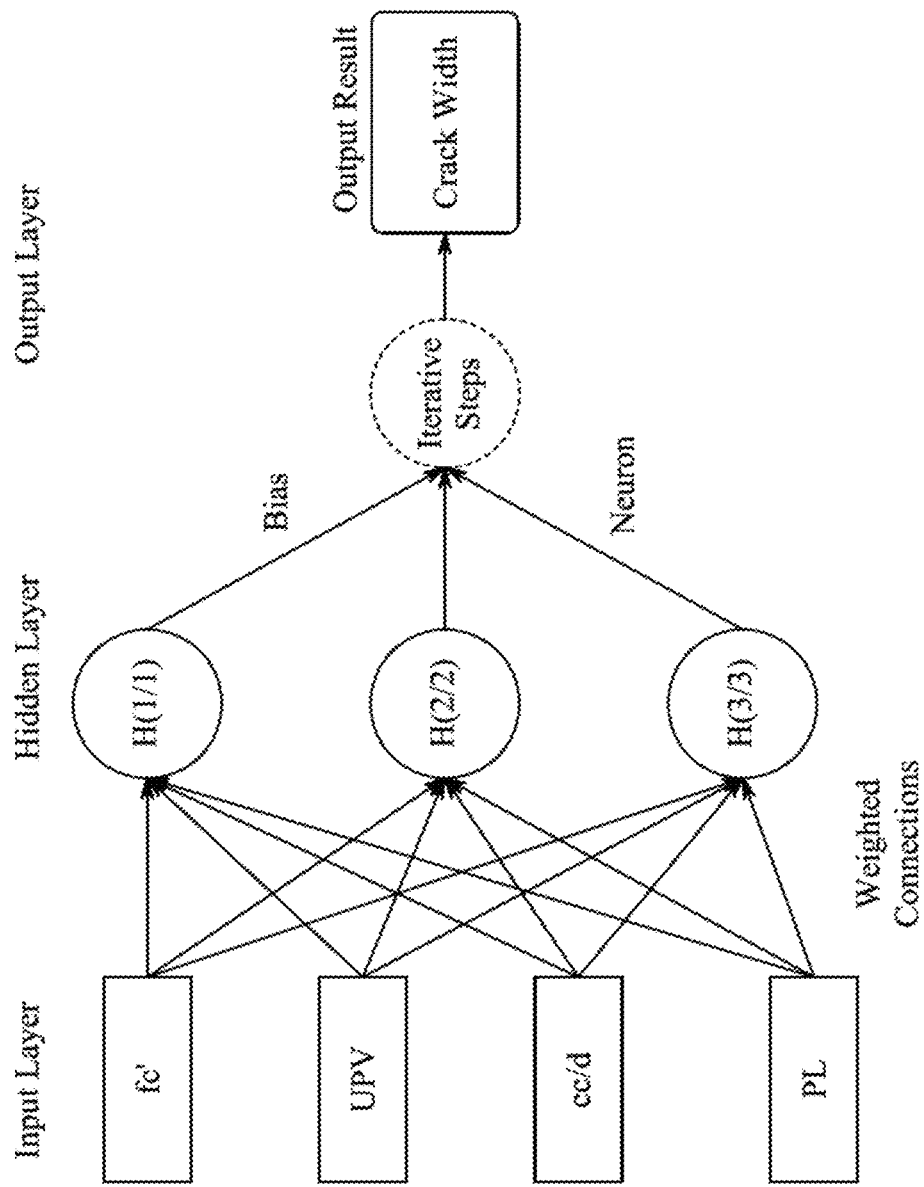
FIG. 22 illustrates an FFMLP-4-3-1 three-layered feed-forward artificial neural network, according to exemplary aspects of the present disclosure.

FIG. 21 presents the flow-diagram of the feed-forward artificial multi-layer perceptron neural network. The process begins by selecting the number of hidden layers and number of neurons per layer using a trial and error approach. Since large numbers of input variable can lead to an inefficient neural network with increased probability of overfitting, a conscious effort was made to keep the input variable low. In this regards, factors which are hard to obtain from old built structures were consciously eradicated from the model in order to avoid overfitting. Hence, parameters of water-cement ratio, cement content, type of additives, slump, air entrainment content, initial concrete temperature, ambient air temperature, curing time were not taken into consideration in the model as gathering this type of data would be immensely difficult for field operation teams. Each pre-processed data set was subdivided into three groups: a training, a testing and a hold-out dataset. 60%, 25% and 15% values respectively of data were selected for training, testing and holdout. The holdout data set was used for validation of the developed ANN. 100,000 cycles or a tolerance of was used cut-off condition for termination of the simulation runs. Once the optimum ANN architecture was selected, the network was saved, and further parametric analysis was conducted using the developed ANN. In the present disclosure, the feed-forward multi-layer perception (FFMLP) consists of four input variables as a function of crack width. The ANN employs a novel approach of using material and mechanical factors for predicting the crack width as compared to past research work. These variables consist of the compressive strength of concrete, $f_c'$, the ultrasonic pulse velocity (UPV) to transit the fixed path length, the concrete cover to reinforcement bar ratio (cc/d), and the path length for the ultrasonic pulse to transit (PL). Each of these variables were considered in the developed ANN as shown in FIG. 22. The architecture of the FFMLP consisted of four neurons in the input layer, three neurons in the hidden layer and one neuron the output layer leading to a FFMLP-4-3-1 network. Pearson's correlation coefficient of FFMLP was achieved as Table 6 presents the weightage, biases and influence importance of parameters of FFMLP-4-3-1 artificial neural network.

TABLE 6

Weightage, Biases and Influence Importance of parameters of FFMLP-4-3-1 Artificial Neural Network

| Hidden | Input Layer | | | | Output |
|---|---|---|---|---|---|
| Layer | fc' | UPV | cc/d | PL | Layer |
| Bias | −0.8419 | −2.7861 | −3.0199 | 5.4072 | −0.7542 |
| 1 | −0.1893 | 1.0491 | 4.7419 | −6.6679 | −7.9770 |
| 2 | 0.7473 | −0.0929 | 0.8007 | 0.1442 | −11.081 |
| 3 | −9.8617 | 4.3111 | −17.611 | −19.074 | 2.3372 |
| 4 | 4.8301 | −0.6444 | 11.500 | 2.7793 | 9.1120 |
| Imp. % | 43.91 | 21.17 | 19.08 | 15.84 | |

Figure 23:
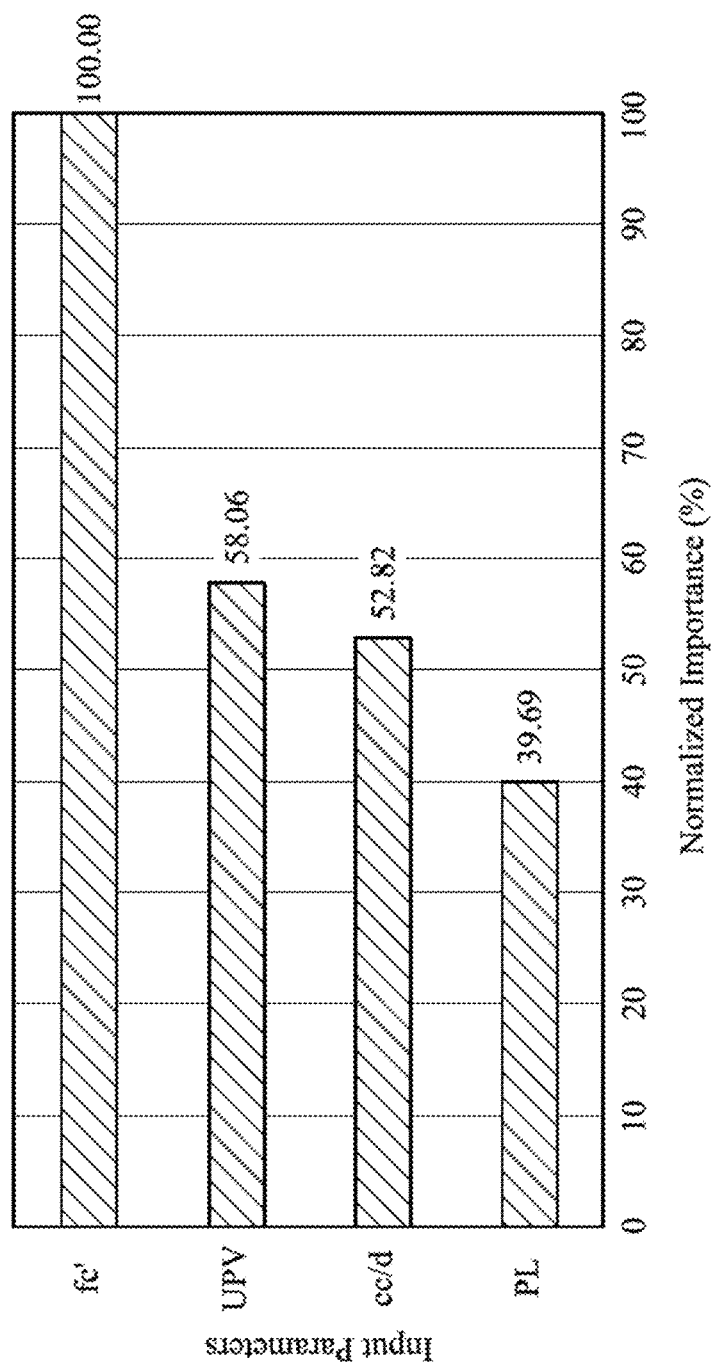
FIG. 23 is a graph of the normalized importance of influence parameters, according to exemplary aspects of the present disclosure.

FIG. 23 presents the normalized importance of the influence variable used in the presented study. From the result, it is evident that concrete compressive strength, $f_c'$, has the highest influence on the bond performance of steel reinforcement embedded in the concrete followed by UPV. Ample concrete cover (cc/d) mandatory for bond development as reduction in cover leads to lower bond performance and cracking at the steel-concrete interface, while the path length for the ultrasonic pulse velocity has the least influence on the bond characteristics. Experimental evidence by past researchers (See: Nolan C. and Andres, W. (2019). "Investigation of the effects of corrosion on bond strength of steel in concrete using neural network". The 2019 World Congress on Advances in Structural Engineering and Mechanics (ASEM19) Jeju Island. Korea, Sep. 17-21, 2019; Hakim, S. and Abdul Razak, H. (2014). "Modal parameters based structural damage detection using artificial neural networks—a review". Smart Structures and Systems, An Int'l Journal, 14(2), 159-189, DOI: hypertext transfer protocol ://dx.doi.org/10.12989/sss.2014.14.2.159) have shown that micro-crack development at the steel-concrete interface reduces the UPV. Hence, the above findings are inconsistence with the past research.

Figure 24:
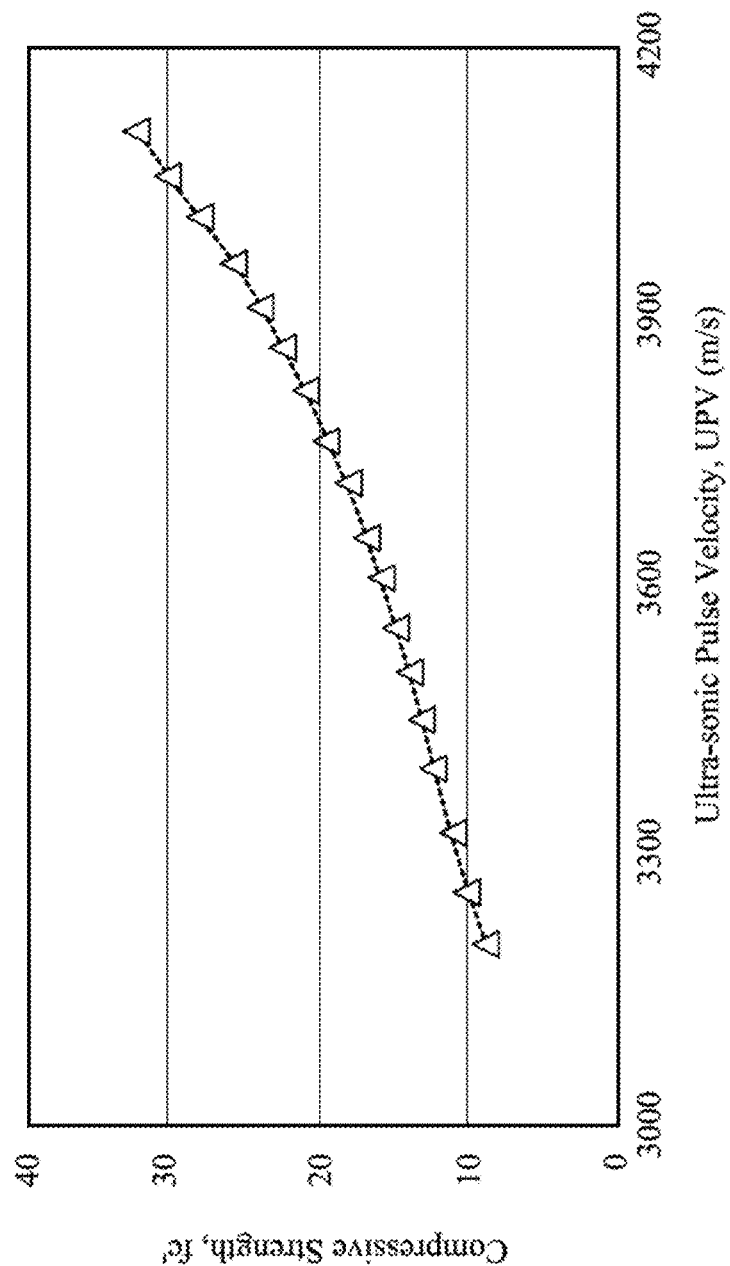
FIG. 24 is a graph of the variation in compressive strength with respect to UPV, according to exemplary aspects of the present disclosure.
Figure 25:
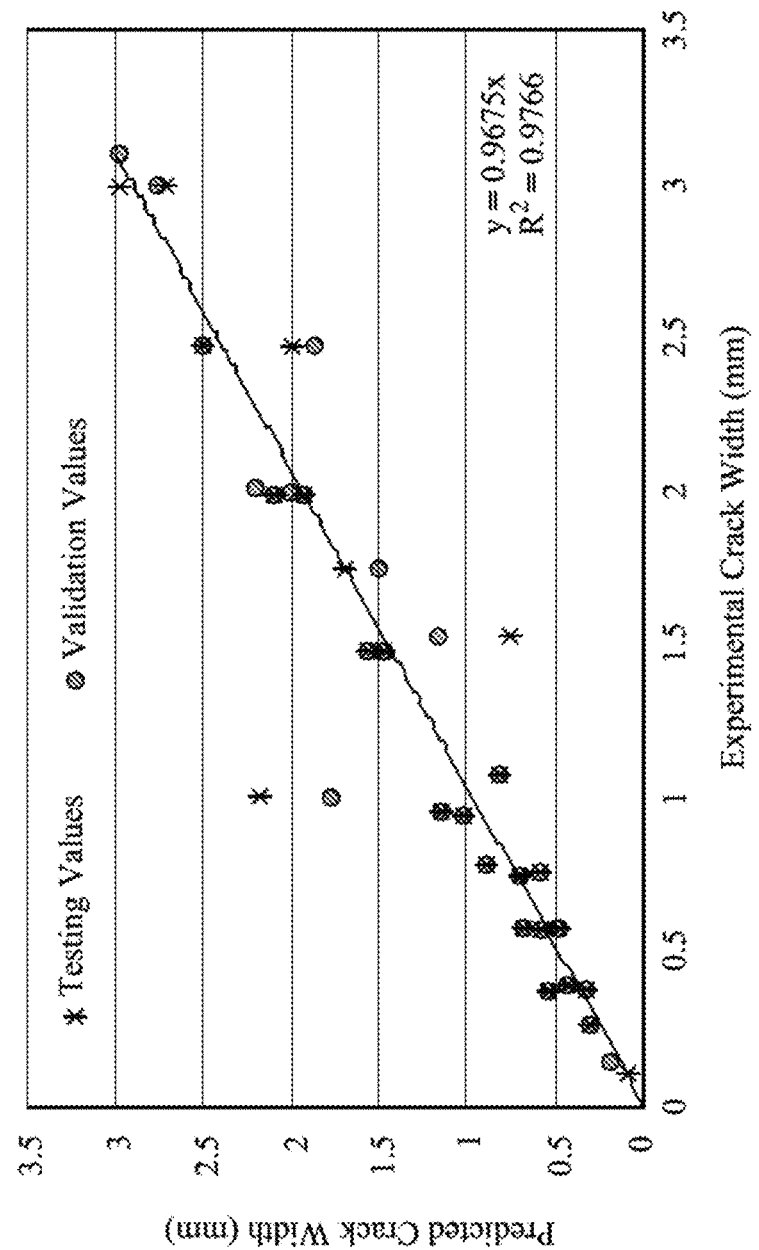
FIG. 25 is a graph of the predicted crack width with respect to the experimental crack width, according to exemplary aspects of the present disclosure.

A parametric sensitivity influence analysis was conducted in order to investigate of the effect of these parameters in isolation with regards to other parameters. The objective of this analysis was to identify the influence of each parameter in isolation with other. For this purpose, variation in various parameters were investigated using the FFMPL-4-3-1 ANN by isolating a parameter and evaluating its effect of other indicators. For this purpose, FIG. 24 indicates the variation in concrete strength with respect to UPV. It can be noted that as the concrete strength increase the UPV increases, indicating a better bond condition. This finding further validates the observation that delay in ultrasonic pulses transiting the same path length can be related to the presence of microcracks at the steel-concrete interface, thus leading to a lower bond quality. Furthermore, FIG. 25 depicts the comparison between the experimental crack width and the predicted crack width by FFMPL-4-3-1 ANN. This results proves that the ANN model is successful in predicting the crack width. The training, and validation phases of the ANN produced favorable results. In the training phase, 77% of the predicted results were within the accuracy threshold limit of 15% with an error of 16.17%. In the validation phase, 86% predicted values were within the threshold limit with maximum and minimum error of 12.24% and 0.03% respectively. Therefore, the FFMLP-4-3-1 ANN is successful in taking into consideration the complex interaction of parameters that influence the bond performance of the beam element and is successful in predicting the crack width. A good agreement is found between the experimental and the predicted results by the FFMLP-4-3-1 ANN.

It is understood that the examples, embodiments, and teachings presented in the present disclosure are described merely for illustrative purposes. Any variations or modifications thereof are to be included within the scope of the present disclosure as discussed.

The first embodiment is illustrated with respect to FIGS. 1-18F. The first embodiment describes a method for non-destructive testing of a bond condition of concrete beams reinforced by steel rods. The method includes applying, by a transmitting transducer of an ultrasonic tester, ultrasonic pulses to a concrete beam; receiving, by a receiving transducer, vibrational waves reflected from the steel rods at a plurality of reading locations along the concrete beam; measuring a transit time of the vibrational waves received at each reading location; determining a pulse velocity of each vibrational wave received at each reading location; determining a highest pulse velocity of the vibrational waves at each reading location; comparing the highest pulse velocity of the vibrational waves received at a reading location to a first reference pulse velocity; and identifying a bond condition of cracking around a steel rod at a testing location when the highest pulse velocity at the testing location is less than the first reference pulse velocity.

The method further includes determining the pulse velocity of a vibrational wave at each reading location by dividing a distance of the receiving transducer from the reading location by the transit time.

The method further includes determining a peak load carrying capacity ($P_{peak}$) of the concrete beam by applying a force perpendicular to a center of a length of the concrete beam; applying ultrasonic pulses to the concrete beam; determining a highest pulse velocity at each reading location; increasing a magnitude of the force by increments; determining a highest pulse velocity at each reading location for each incremental increase in the magnitude of the force; and determining the $P_{peak}$ of the concrete beam when the highest pulse velocity at one of the reading locations is less than a second reference pulse velocity.

The method comprises predicting, by an artificial neural network, a width of each crack formed around the bonds in the concrete.

The method further includes marking the concrete beam with a grid having two rows and a plurality of columns; wherein an intersection of a row with a column defines a reading location.

A first row is parallel to and separated from a second row by a distance in the range of 140 mm to 160 mm; and each column is parallel an adjacent column and separated from the adjacent column by a distance in the range of 90 mm to 110 mm.

The method further includes determining the first reference pulse velocity at each reading location by measuring, the highest pulse velocity when the force applied to the concrete beam is zero.

The method further includes determining the second reference pulse velocity at each reading location by measuring the highest pulse velocity when the force applied to the concrete beam is 75% of the peak load carrying capacity.

The method further includes marking the reading locations on a first row parallel to a length of a first steel rod within the concrete beam; and marking the reading locations on a second row parallel to a length of a second steel rod within the concrete beam.

The method further includes attaching the ultrasonic receiver to the concrete beam at a location perpendicular to a length of the steel rods; and contacting the transmitting transducer to the concrete beam at each of the plurality of reading locations.

The second embodiment is illustrated with respect to FIGS. 1-18F. The second embodiment describes a non-destructive ultrasonic testing method of a bond condition of a concrete beam reinforced by steel rods. The non-destructive ultrasonic testing method includes applying, by a transmitting transducer of an ultrasonic tester, ultrasonic pulses to a concrete beam; receiving, by a receiving transducer, vibrational waves reflected from the steel rods at a plurality of reading locations along the concrete beam; measuring a transit time of the vibrational waves received at each reading location; determining a pulse velocity of each vibrational wave received at each reading location; determining a highest pulse velocity of the vibrational waves at each reading location, the highest pulse velocity at each reading location defining a first reference pulse velocity at the reading location; determining a peak load carrying capacity ($P_{peak}$) of the concrete beam by applying a force perpendicular to a center of a length of the concrete beam; applying a second set of ultrasonic pulses to the concrete beam; measuring a highest pulse velocity at each reading location received from the second set of ultrasonic pulses; increasing a magnitude of the force by increments; measuring a highest pulse velocity at each reading location for each incremental increase in the magnitude of the force; and determining the $P_{peak}$ of the concrete beam when the highest pulse velocity at one of the reading locations is less than a second reference pulse velocity, wherein the second reference pulse velocity is less than the first reference pulse velocity.

The non-destructive ultrasonic testing method further includes determining the pulse velocity of a vibrational wave at each reading location by dividing a distance of the receiving transducer from the reading location by the transit time.

The non-destructive ultras testing method further includes determining the second reference pulse velocity at each reading location by measuring the highest pulse velocity when the force applied to the concrete beam is 75% of the peak load carrying capacity.

The non-destructive ultrasonic testing method further includes comparing the highest pulse velocity of the vibrational waves received at a reading location to the second reference pulse velocity; and identifying a bond condition of cracking around a steel rod at a testing location when the highest pulse velocity at the testing location is less than the second reference pulse velocity.

The non-destructive ultrasonic testing method further includes marking the concrete beam with a grid having two rows and a plurality of columns; wherein an intersection of a row with a column defines a reading location.

The non-destructive ultrasonic testing method further includes performing an ultrasonic velocity test of the concrete beam by attaching the ultrasonic receiver to the concrete beam at a location perpendicular to a length of the steel rods; and contacting the transmitting transducer to the concrete beam at each of the plurality of reading locations.

The third embodiment is illustrated with respect to FIGS. 1-18F. The third embodiment describes a system for non-destructive testing, of a bond condition of concrete beams reinforced by steel rods. The system for the non-destructive testing includes a transducing transmitter; a transducing receiver; an ultrasonic pulse generator configured to generate drive signals for the transducing transmitter and receive a plurality vibrational waves at the transducing receiver; a computing device including: a measurement circuit configured to record a transit time for each vibrational wave and divide a distance between the transducing transmitter and the transducing receiver by the transit time to determine a pulse velocity of each vibrational wave; a comparison circuit configured to identify a highest pulse velocity of the vibrational waves and compare each highest pulse velocity to a first reference pulse velocity; and a decision circuit configured to identify a compromised bond condition around a steel rod when the highest pulse velocity is less than the first reference pulse velocity.

The system for non-destructive testing further includes a peak load testing device including a first support configured to support a first bottom end of the concrete beam; a second support configured to support a second bottom end of the concrete beam; a force applicator configured to provide a variable force to a top center of the concrete beam; and wherein the computing device is further configured to record measurements of the pulse velocities at a plurality of reading locations for each change in the variable force and identify an amplitude of the variable force at which the highest pulse velocity is less than a second reference pulse velocity, wherein the second reference pulse velocity indicates a bond condition of cracking of the concrete around a steel rod.

The system for non-destructive testing further includes determining the second reference pulse velocity at each reading location by measuring the highest pulse velocity when the force applied to the concrete beam is 75% of a peak load carrying capacity.

Figure 26:
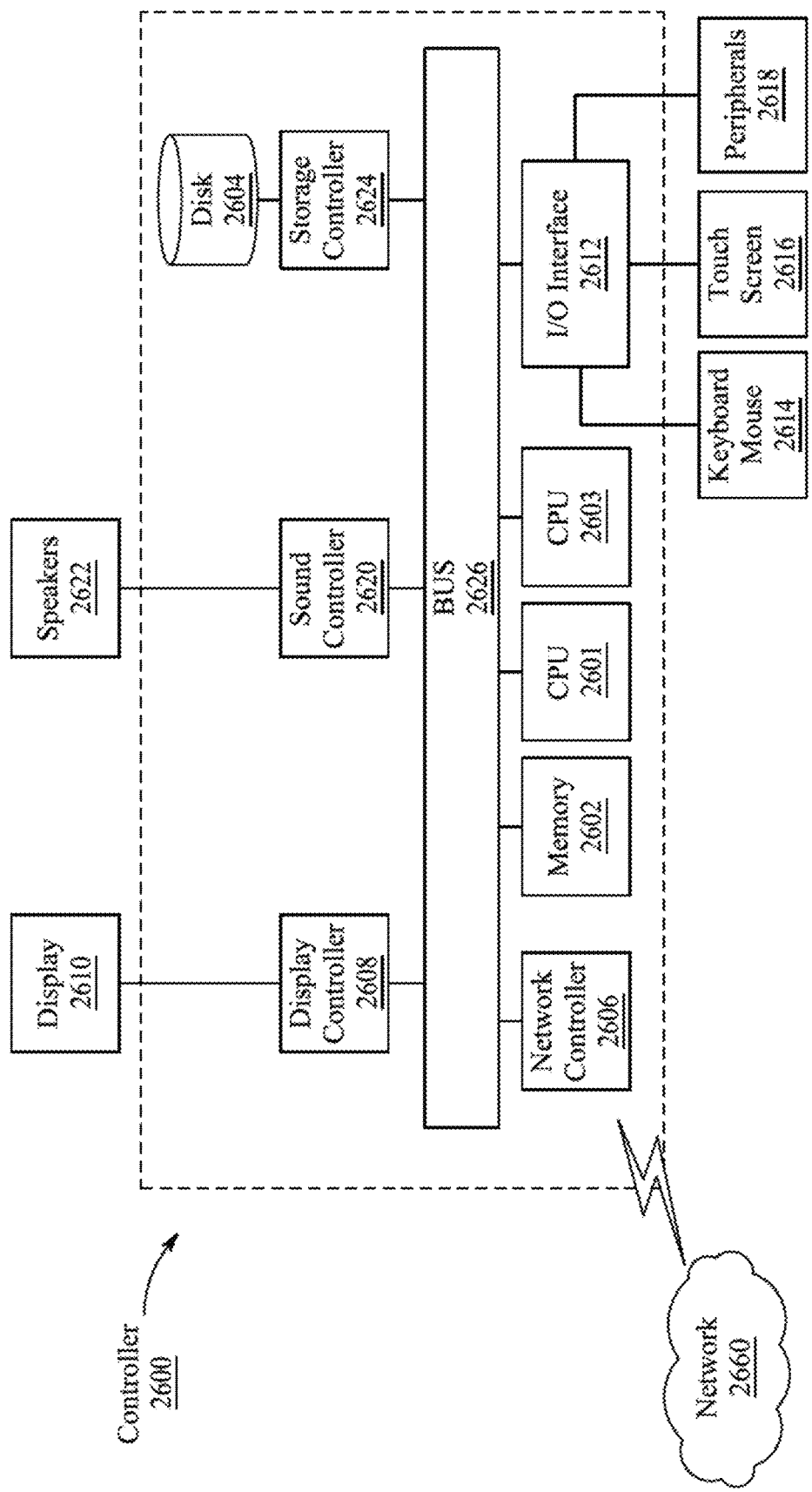
FIG. 26 is an illustration of a non-limiting example of details of computing hardware used in the computing system, according to exemplary aspects of the present disclosure.

FIG. 26 is an illustration of a non-limiting example of details of computing hardware used in the computing system, according to exemplary aspects of the present disclosure. In FIG. 26, a controller 2600 is described which is a computing device (for example, computing device 108) and includes a CPU 2601 which performs the processes described above/below. The process data and instructions may be stored in memory 2602. These processes and instructions may also be stored on a storage medium disk 2604 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system or combination thereof executing in conjunction with CPU 2601, 2603 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 2601 or CPU 2603 may be a Xenon or Core processor from Intel of America or an Opteron processor from AMD of America, or may be other processor types that would be recognized by one of ordinary skill in the art. Alternatively, the CPU 2601, 2603 may be implemented on an FPGA, ASIC, PLD or using discrete logic circuits, as one of ordinary skill in the art would recognize. Further, CPU 2601, 2603 may be implemented as multiple processors cooperatively working in parallel to perform the instructions of the inventive processes described above.

The computing device in FIG. 26 also includes a network controller 2606, such as an Intel Ethernet PRO network interface card from Intel Corporation of America, for interfacing with network 2660. As can be appreciated, the network 2660 can be a public network, such as the Internet, or a private network such as an LAIN or WAN network, or any combination thereof and can also include PSTN or ISDN sub-networks. The network 2660 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 2608, such as a NVIDLA GeForce GTX or Quadro graphics adaptor from NVIDIA Corporation of America for interfacing with display 2610, such as a Hewlett Packard HPL2445w LCD monitor. A general purpose I/O interface 2612 interfaces with a keyboard and or mouse 2614 as well as a touch screen panel 2616 on or separate from display 2610. General purpose I/O interface also connects to a variety of peripherals 2618 including printers and scanners, such as an OfficeJet or DeskJet from Hewlett Packard.

A sound controller 2620 is also provided in the computing device such as Sound Blaster X-Fi Titanium from Creative, to interface with speakers/microphone 2622 thereby providing sounds and/or music.

The general-purpose storage controller 2624 connects the storage medium disk 2604 with communication bus 2626, which may be an ISA, EISA, VESA, PCI, or similar, for interconnecting all of the components of the computing device. A description of the general features and functionality of the display 2610, keyboard and/or mouse 2614. as well as the display controller 2608, storage controller 2624, network controller 2606, sound controller 2620, and general purpose I/O interface 2612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 27.

Figure 27:
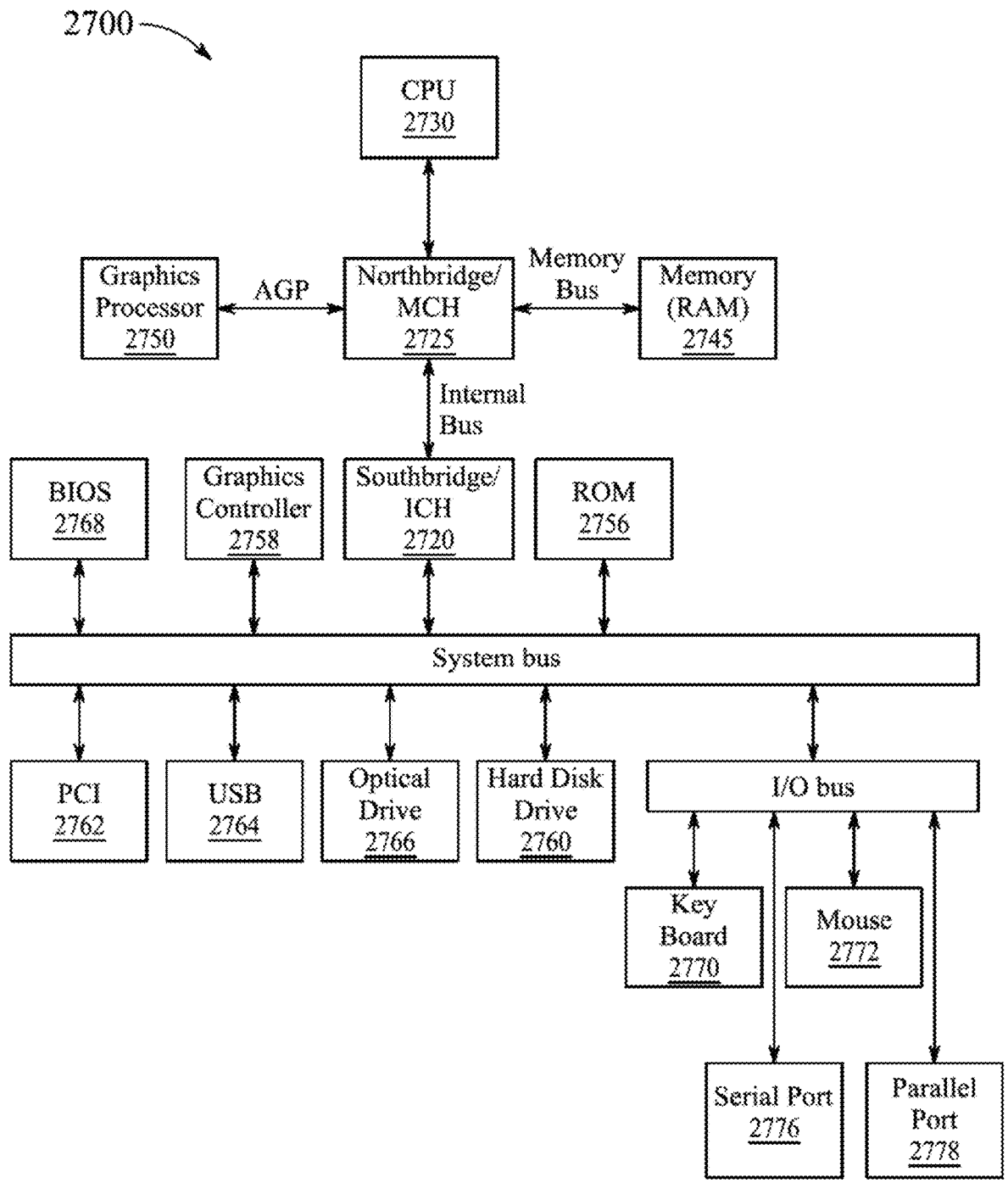
FIG. 27 is an exemplary schematic diagram of a data processing system used within the computing system, according to exemplary aspects of the present disclosure.

FIG. 27 shows a schematic diagram of a data processing system 2700 used within the computing system, according to exemplary aspects of the present disclosure. The data processing system 2700 is an example of a computer in which code or instructions implementing the processes of the illustrative aspects of the present disclosure may be located.

In FIG. 27, data processing system 2730 employs a hub architecture including a north bridge and memory controller hub (NB/MCH) 2725 and a south bridge and input/output (I/O) controller hub (SB/ICH) 2727. The central processing unit (CPU) 2730 is connected to NB/MCH 2775. The NB/MCH 2725 also connects to the memory 2745 via a memory bus, and connects to the graphics processor 2750 via an accelerated graphics port (AGP). The NB/MCH 2725 also connects to the SB/ICH 2727 via an internal bus (e.g., a unified media interface or a direct media interface). The CPU Processing unit 2730 may contain one or more processors and even may be implemented using one or more heterogeneous processor systems.

Figure 28:
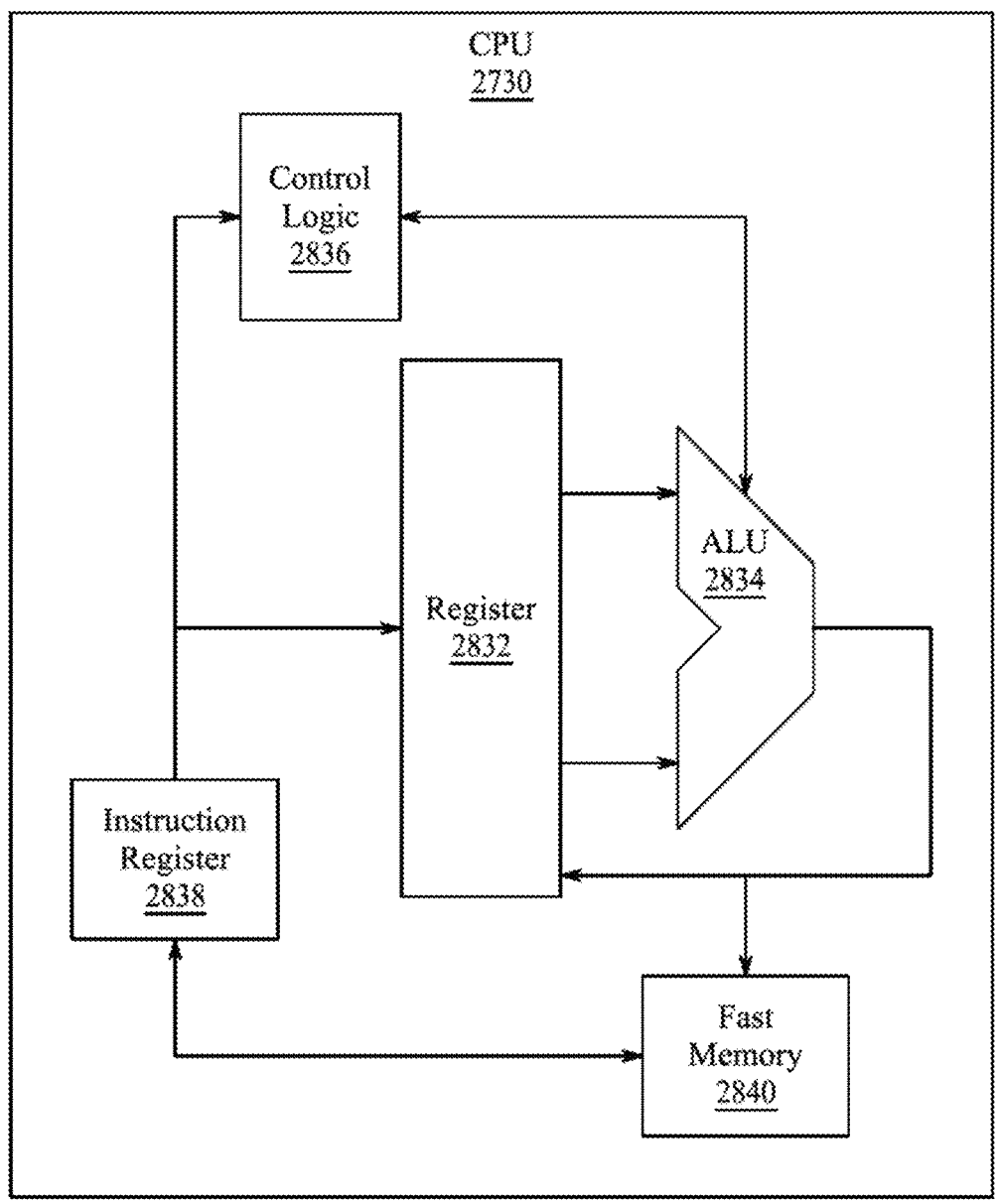
FIG. 28 is an exemplary schematic diagram of a processor used with the computing system, according to exemplary aspects of the present disclosure.

For example, FIG. 28 shows one aspects of the present disclosure of CPU 2730. In one aspect of the present disclosure, the instruction register 2838 retrieves instructions from the fast memory 2840. At least part of these instructions is fetched from the instruction register 2838 by the control logic 2836 and interpreted according to the instruction set architecture of the CPU 2730. Part of the instructions can also be directed to the register 2832. In one aspects of the present disclosure the instructions are decoded according to a hardwired method, and in another aspects of the present disclosure the instructions are decoded according a microprogram that translates instructions into sets of CPU configuration signals that are applied sequentially over multiple clock pulses. After fetching, and decoding the instructions, the instructions are executed using the arithmetic logic unit (ALU) 2834 that loads values from the register 2832 and performs logical and mathematical operations on the loaded values according to the instructions. The results from these operations can be feedback into the register and/or stored in the fast memory 2840. According, to certain aspects of the present disclosures, the instruction set architecture of the CPU 2730 can use a reduced instruction set architecture, a complex instruction set architecture, a vector processor architecture, a very large instruction word architecture.

Furthermore, the CPU 2730 can be based on the Von Neuman model or the Harvard model. The CPU 2730 can be a digital signal processor, an FPGA, an ASIC, a PLA, a PLD, or a CPLD. Further, the CPU 2730 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 27, the data processing system 2730 can include that the SB/ICH 2727 is coupled through a system bus to an I/O Bus, a read only memory (ROM) 2756, universal serial bus (USB) port 2764, a flash binary input/output system (BIOS) 2768, and a graphics controller 2758. PCI/PCIe devices can also be coupled to SB/ICH 2727 through a PCI bus 2762.

The PCI devices may include, for example, Ethernet adapters, add-in cards, and PC cards for notebook computers. The Hard disk drive 2760 and CD-ROM 2756 can use, for example, an integrated drive electronics (IDE) or serial advanced technology attachment (SATA) interface. In one aspects of the present disclosure the I/O bus can include a super I/O (SIO) device.

Further, the hard disk drive (HDD) 2760 and optical drive 2766 can also be coupled to the SB/ICH 2727 through a system bus. In one aspects of the present disclosure, a keyboard 2770, a mouse 2772, a parallel port 2778, and a serial port 2776 can be connected to the system bus through the I/O bus. Other peripherals and devices that can be connected to the SB/ICH 2727 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 29:
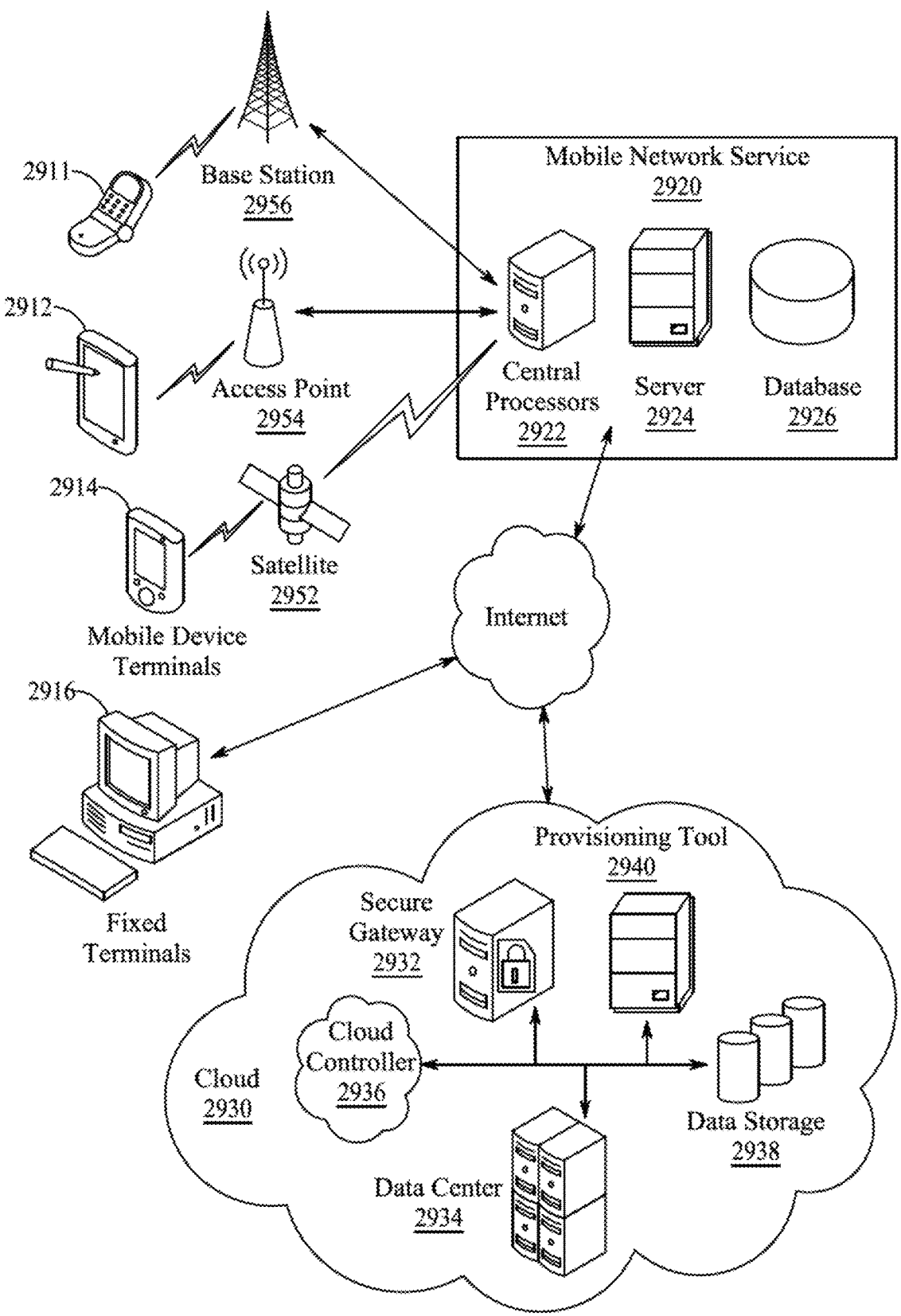
FIG. 29 is an illustration of a non-limiting, example of distributed components which may share processing with the controller, according to exemplary aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 29, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed. The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. Concrete beam testing method, comprising:
casting a Portland cement around steel reinforcements and curing to form a concrete beam with steel reinforcements;
applying, by a transmitting transducer of an ultrasonic tester, ultrasonic pulses to the concrete beam with steel reinforcements, wherein the transmitting transducer operates at a frequency of from 20 kHz to 150 kHz;
receiving, by a receiving transducer, vibrational waves reflected from the steel rods at a plurality of reading locations along the concrete beam;
measuring a transit time of the vibrational waves received at each reading location;
determining a pulse velocity of each vibrational wave received at each reading location;
determining a highest pulse velocity of the vibrational waves at each reading location;
comparing the highest pulse velocity of the vibrational waves received at a reading location to a first reference pulse velocity; and identifying a bond condition of cracking around a steel rod at a testing location when the highest pulse velocity at the testing location is less than the first reference pulse velocity;

determining a peak load carrying capacity ($P_{peak}$) of the concrete beam by:
 applying a force perpendicular to a center of a length of the concrete beam;
 applying ultrasonic pulses to the concrete beam:
 determining the highest pulse velocity at each reading location;
 increasing a magnitude of the force by equal increments of 10%;
 determining the highest pulse velocity at each reading location for each incremental increase in the magnitude of the force; and
 determining the peak load carrying capacity ($P_{peak}$) of the concrete beam when the highest pulse velocity at one of the reading locations is less than a second reference pulse velocity.

2. The method of claim 1, wherein the vibrational waves reflected from the steel reinforcements in the concrete beam are received with the receiving transducer operating at a frequency of 60 KHz.

3. The method of claim 1, wherein the ultrasonic pulses applied to the concrete beam have a pulse velocity of from 4950 to 5472 m/s.

4. The method of claim 1, further comprising
predicting, by an artificial neural network, a width of each crack formed around the bonds in the concrete beam.

5. The method of claim 1, further comprising:
marking the concrete beam with a grid having two rows and a plurality of columns;
wherein an intersection of a row with a column defines a reading location.

6. The method of claim 5, wherein:
a first row is parallel to and separated from a second row by a distance in the range of 140 mm to 160 mm; and
each column is parallel to an adjacent column and separated from the adjacent column by a distance in the range of 90 mm to 110 mm.

7. The method of claim 5, further comprising:
determining the first reference pulse velocity at each reading location by measuring the highest pulse velocity when the force applied to the concrete beam is zero.

8. The method of claim 5, further comprising:
marking the reading locations on a first row parallel to a length of a first steel rod reinforcement within the concrete beam; and
marking the reading locations on a second row parallel to a length of a second steel rod reinforcement within the concrete beam.

9. The method of claim 1, further comprising:
attaching the receiving transducer to the concrete beam at a location perpendicular to a length of the steel reinforcements; and
contacting the transmitting transducer to the concrete beam at each of the plurality of reading locations.

\* \* \* \* \*